US012182418B2

(12) United States Patent
Huang et al.

(10) Patent No.: US 12,182,418 B2
(45) Date of Patent: Dec. 31, 2024

(54) MEMORY CONTROLLER, MEMORY SYSTEM AND OPERATION METHOD THEREOF

(71) Applicant: Yangtze Memory Technologies Co., Ltd., Hubei (CN)

(72) Inventors: Zhen Huang, Hubei (CN); Kang Li, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 71 days.

(21) Appl. No.: 18/090,060

(22) Filed: Dec. 28, 2022

(65) Prior Publication Data

US 2024/0168651 A1 May 23, 2024

(30) Foreign Application Priority Data

Nov. 18, 2022 (CN) .......................... 202211449324.4

(51) Int. Cl.
*G06F 3/06* (2006.01)
(52) U.S. Cl.
CPC ............ *G06F 3/0619* (2013.01); *G06F 3/064* (2013.01); *G06F 3/0659* (2013.01); *G06F 3/0679* (2013.01)

(58) Field of Classification Search
CPC ...... G06F 3/0619; G06F 3/064; G06F 3/0659; G06F 3/0679
See application file for complete search history.

(56) References Cited

U.S. PATENT DOCUMENTS

| 2017/0154657 A1* | 6/2017 | Kim | G11C 11/5642 |
| 2020/0133767 A1* | 4/2020 | Yang | H03M 13/1111 |
| 2021/0279000 A1* | 9/2021 | Cho | G06F 3/0679 |
| 2023/0176768 A1* | 6/2023 | Asadi | G11C 16/0483 |

* cited by examiner

*Primary Examiner* — Francisco A Grullon
(74) *Attorney, Agent, or Firm* — Oblon, McClelland, Maier & Neustadt, L.L.P.

(57) ABSTRACT

A memory controller, a memory system and an operation method thereof are provided. The memory controller can be used to control a memory device, and be configured to search, according to the number of erase cycles of the memory block, for a read retry table corresponding to a range to which the number of erase cycles belongs, when reading fails. The read retry table can include a plurality of read bias groups. The memory controller can further be configured to perform read retry operations on the memory block according to the read bias groups in the read retry table. The read retry table corresponding to the range to which the number of erase cycles of the memory block belongs may be found by index searching with the number of erase cycles, based on the retry read voltages in the optimal read bias group that the memory device has had initially.

20 Claims, 12 Drawing Sheets

| EC Classification Options | First Programming Status Lower Page | Second Programming Status Middle Page | Third Programming Status Upper Page | Fourth Programming Status Middle Page | Fifth Programming Status Lower Page | Sixth Programming Status Middle Page | Seventh Programming Status Upper Page | Options | | Remarks |
|---|---|---|---|---|---|---|---|---|---|---|
| | Value (mv) | Value (mv) | Value (mv) | Value (mv) | Value (mv) | Value (mv) | Value (mv) | Storage Status | Stored Amount | Test Item |
| Fresh (0~300) | | | | | | | | MLC | Full Storage | Test Item 1 |
| | | | | | | | | MLC | Under-Full Storage | Test Item 2 |
| | | | | | | | | TLC | Full Storage | Test Item 3 |
| | | | | | | | | TLC | Under-Full Storage | Test Item 4 |
| | | | | | | | | QLC | Full Storage | Test Item 1 |
| | | | | | | | | QLC | Under-Full Storage | Test Item 2 |
| | | | | | | | | PLC | Full Storage | Test Item 1 |
| | | | | | | | | PLC | Under-Full Storage | Test Item 2 |
| | | | | | | | | PLC | Full Storage | Test Item 3 |
| | | | | | | | | PLC | Under-Full Storage | Test Item 4 |

Fig. 12

| EC Classification Options | First Programming Status Lower Page | Second Programming Status Middle Page | Third Programming Status Upper Page | Fourth Programming Status Middle Page | Fifth Programming Status Lower Page | Sixth Programming Status Middle Page | Seventh Programming Status Upper Page | Options | | Remarks |
|---|---|---|---|---|---|---|---|---|---|---|
| | Value (mv) | Value (mv) | Value (mv) | Value (mv) | Value (mv) | Value (mv) | Value (mv) | Storage Status | Stored Amount | Test Item |
| BOL (300~2700) | | | | | | | | MLC | Full Storage | Test Item 1 |
| | | | | | | | | MLC | Under-Full Storage | Test Item 2 |
| | | | | | | | | TLC | Full Storage | Test Item 3 |
| | | | | | | | | TLC | Under-Full Storage | Test Item 4 |
| | | | | | | | | QLC | Full Storage | Test Item 1 |
| | | | | | | | | QLC | Under-Full Storage | Test Item 2 |
| | | | | | | | | PLC | Full Storage | Test Item 1 |
| | | | | | | | | PLC | Under-Full Storage | Test Item 2 |
| | | | | | | | | PLC | Full Storage | Test Item 3 |
| | | | | | | | | SLC | None | Test Item 4 |

Fig. 13

| EC Classification Options | First Programming Status Lower Page | Second Programming Status Middle Page | Third Programming Status Upper Page | Fourth Programming Status Middle Page | Fifth Programming Status Lower Page | Sixth Programming Status Middle Page | Seventh Programming Status Upper Page | Options | | Remarks |
|---|---|---|---|---|---|---|---|---|---|---|
| | Value (mv) | Value (mv) | Value (mv) | Value (mv) | Value (mv) | Value (mv) | Value (mv) | Storage Status | Stored Amount | Test Item |
| EOL (2700 ~ 3000) | | | | | | | | MLC | Full Storage | Test Item 1 |
| | | | | | | | | MLC | Under-Full Storage | Test Item 2 |
| | | | | | | | | TLC | Full Storage | Test Item 3 |
| | | | | | | | | TLC | Under-Full Storage | Test Item 4 |
| | | | | | | | | QLC | Full Storage | Test Item 1 |
| | | | | | | | | QLC | Under-Full Storage | Test Item 2 |
| | | | | | | | | PLC | Full Storage | Test Item 1 |
| | | | | | | | | PLC | Under-Full Storage | Test Item 2 |
| | | | | | | | | PLC | Full Storage | Test Item 3 |
| | | | | | | | | SLC | None | Test Item 4 |

Fig. 14

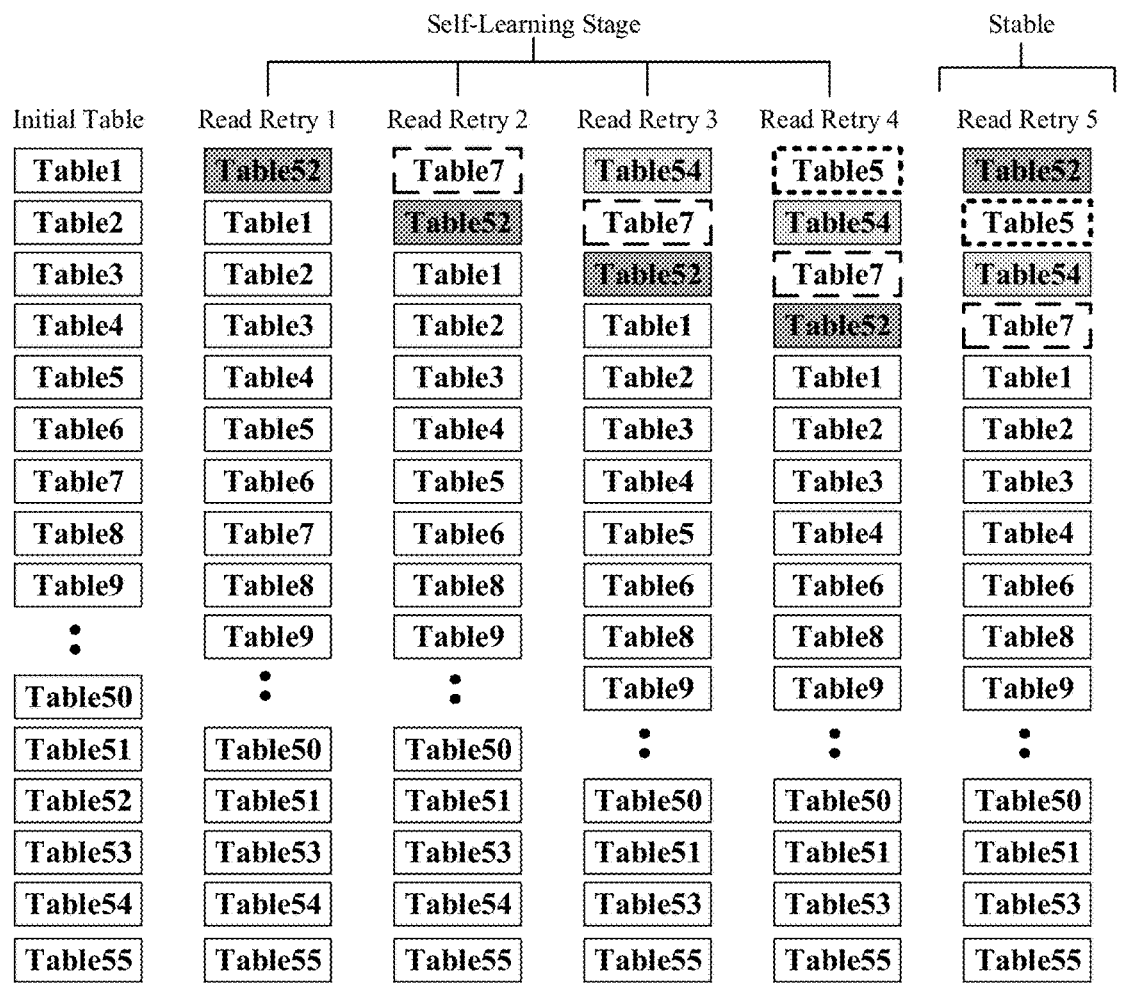

Fig. 15

MEMORY CONTROLLER, MEMORY SYSTEM AND OPERATION METHOD THEREOF

CROSS-REFERENCE TO RELATED APPLICATIONS

This present disclosure claims the benefit of Chinese Patent Application No. 202211449324.4 filed on Nov. 18, 2022, which is incorporated herein by reference in its entirety.

TECHNICAL FIELD

The present disclosure relates to the technical field of semiconductors, and in particular to a memory controller, a memory system and an operating method thereof.

BACKGROUND

NAND Flash devices have demonstrated their capabilities in dealing with high-density solid-state storage in the field of mobile product applications. With its large capacity and fast access speed, NAND Flash is widely applied in various fields that need storage of large amounts of data. Since the process of NAND Flash cannot guarantee its arrays of semiconductor technology field to maintain performance reliably during its life cycle, NAND Flash may thus generate bad block(s) during production and use, resulting in the loss of stored data. Due to the characteristics of the NAND Flash physical medium, it is susceptible to data errors caused by bit flip. Consequently, it is a constant challenge in term of how to efficiently detect and correct errors to maintain data reliability in the systems using NAND Flash.

SUMMARY

Implementations of the present disclosure provide a memory controller, a memory system and an operation method thereof to efficiently detect and correct errors and improve data reading reliability.

In a first aspect, implementations of the present disclosure provide a memory controller for controlling a memory device. The memory device can include a plurality of memory blocks for storing data. The memory controller can be configured to:
  search, according to the number of erase cycles of the memory block, for a read retry table corresponding to a range to which the number of erase cycles belongs, when reading fails; the read retry table comprises a plurality of read bias groups; and
  perform read retry operations on the memory block according to the plurality of read bias groups in the read retry table.

In some implementations, the number of erase cycles is classified into an initial stage, an early stage, and an end stage according to the numbers of erase cycles of the plurality of memory blocks.

In some implementations, the memory controller can be further configured to:
  fetch a read retry table corresponding to storage status of the memory block within the range to which the number of erase cycles belongs, according to the storage status.

In some implementations, the storage status can be classified into single-level storage status and multi-level storage status according to a programming mode of the memory block.

In some implementations, the multi-level storage status can further include multi-stage full storage status and multi-stage under-full storage status that are obtained by classifying according to a stored amount of the memory block.

In some implementations, the memory controller can be further configured to:
  fetch a read retry table corresponding to a test item of the memory block within the range to which the number of erase cycles belongs, according to the test item.

In some implementations, the memory controller can be further configured to:
  search, according to an average value of multiple numbers of erase cycles of the plurality of memory blocks, for a read retry table corresponding to a range to which the average value of the multiple numbers of erase cycles belongs, when reading fails.

In some implementations, the read bias group can include read voltage parameters of different word lines.

In some implementations, the memory controller can be further configured to:
  search for a read retry table cluster corresponding to the range to which the number of erase cycles belongs; and
  sequentially load, based on a sequential order of storage arrangement of a plurality of read retry tables in the read retry table cluster, the read retry tables in the read retry table cluster to perform the read retry operations.

In some implementations, the memory controller can be further configured to:
  search for a read retry table cluster corresponding to the range to which the number of erase cycles belongs; and
  sequentially load, based on a sequential order of most-recently-use time of a plurality of read retry tables in the read retry table cluster, the read retry tables in the read retry table cluster to perform the read retry operations.

In some implementations, the memory controller can be further configured to:
  search for a read retry table cluster corresponding to the range to which the number of erase cycles belongs; and
  sequentially load, based on a sequential order of read success degrees for a plurality of read retry tables in the read retry table cluster upon performing read operations, the read retry tables in the read retry table cluster to perform the read retry operations.

In a second aspect, implementations of the present disclosure also provide a memory system. For example, the memory system can include:
  a memory device including a plurality of memory blocks for storing data, the memory block including a plurality of memory cells; and,
  a memory controller for controlling the memory device, where the memory controller is configured to:
  search, according to the number of erase cycles of the memory block, for a read retry table corresponding to a range to which the number of erase cycles belongs, when reading fails, the read retry table including a plurality of read bias groups; and
  perform read retry operations on the memory block according to the plurality of read bias groups in the read retry table.

In a third aspect, implementations of the present disclosure also provide an operation method for a memory system. The memory system can include a memory device and a memory controller. The memory device can include a plurality of memory blocks for storing data. The memory block can include a plurality of memory cells. The memory controller can be configured to control the memory device. For example, the operation method can include:

searching, by the memory controller and according to the number of erase cycles of the memory block, for a read retry table corresponding to a range to which the number of erase cycless belongs, when reading fails, the read retry table including a plurality of read bias groups; and performing, by the memory controller, read retry operations on the memory block according to the plurality of read bias groups in the read retry table.

In some implementations, the number of erase cycles can be classified into an initial stage, an early stage, and an end stage according to the numbers of erase cycles of the plurality of memory blocks.

In some implementations, the operation method can further include:

fetching, by the memory controller, a read retry table corresponding to storage status of the memory block within the range to which the number of erase cycles belongs, according to the storage status.

In some implementations, the storage status can be classified into single-level storage status and multi-level storage status according to a programming mode of the memory block. In another embodiment, the multi-level storage status can further include multi-stage full storage status and multi-stage under-full storage status that are obtained by classifying according to a stored amount of the memory block.

In some implementations, the operation method can further include:

searching for a read retry table cluster corresponding to the range to which the number of erase cycles belongs; and sequentially loading, based on a sequential order of storage arrangement of a plurality of read retry tables in the read retry table cluster, the read retry tables in the read retry table cluster to perform the read retry operations.

In some implementations, the operation method can further include:

searching for a read retry table cluster corresponding to the range to which the number of erase cycles belongs; and sequentially loading, based on a sequential order of most-recently-use time of a plurality of read retry tables in the read retry table cluster, the read retry tables in the read retry table cluster to perform the read retry operations.

In some implementations, the operation method can further includes:

searching for a read retry table cluster corresponding to the range to which the number of erase cycles belongs; and sequentially loading, based on a sequential order of read success degrees for a plurality of read retry tables in the read retry table cluster upon performing read operations, the read retry tables in the read retry table cluster to perform the read retry operations.

With the memory controller, the memory system, and the operation method thereof provided in implementations of the present disclosure, when reading fails, the read retry table corresponding to the range to which the number of erase cycles of the memory block belongs is searched for, according to the number of erase cycles, and the read retry operations are performed on the memory block by retry read voltages of the plurality of read bias groups in the read retry table. According to the present disclosure, the read retry table corresponding to the range to which the number of erase cycles of the memory block belongs may be found by index searching with the number of erase cycles, based on the original retry read voltage in the existin optimal read bias group of the memory device, which can not only improve the efficiency of the index searching for the optimal read bias group, but also improve the fitness of the read bias group found by index searching.

BRIEF DESCRIPTION OF THE DRAWINGS

The drawings that are used in the description of implementations of the present disclosure will be briefly introduced below in order to more clearly illustrate the technical solutions in the implementations. Obviously, the drawings in the following description are only some implementations of the present disclosure. Other drawings can be obtained for those skilled in the art without any creative effort, based on these drawings.

FIG. 12 illustrates a schematic diagram of contents of read retry table generated by using an initial stage of life cycle, programming modes, test items, and stored amounts according to some examples;

FIG. 13 illustrates a schematic diagram of contents of read retry table generated by using an early stage of life cycle, programming modes, test items, and stored amounts according to some examples;

FIG. 14 illustrates a schematic diagram of contents of read retry table generated by using an end stage of life cycle, programming modes, test items, and stored amounts according to some examples;

FIG. 15 illustrates a schematic diagram of updating a sequential order of storage arrangement of a plurality of read retry tables in a read retry table group dynamically based on LRU (least recently used) algorithm or success rate according to some examples;

DETAILED DESCRIPTION

Figure 1:
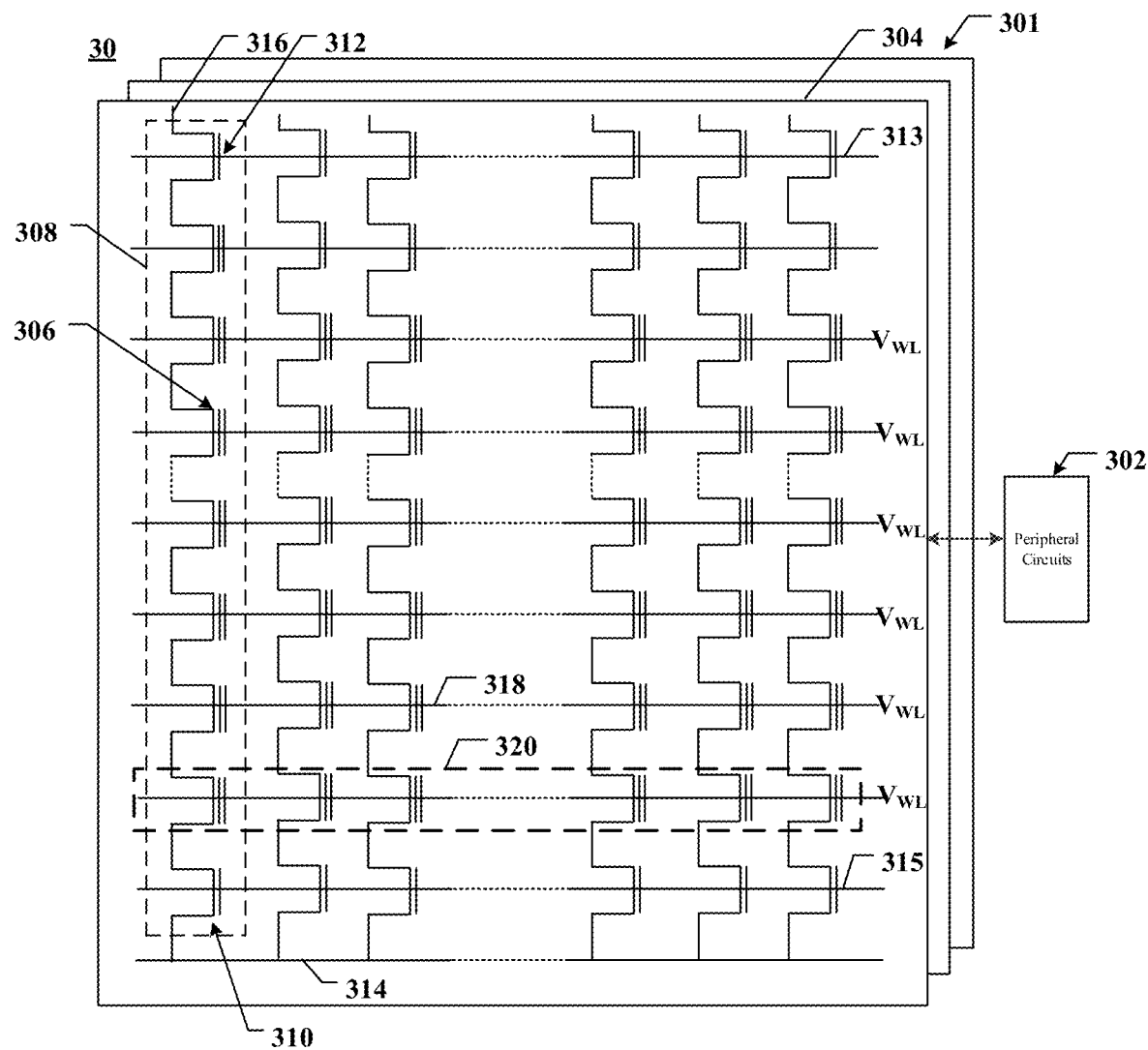
FIG. 1 illustrates a schematic circuit diagram of a memory device according to some examples.

The technical solutions in some implementations of the present disclosure will be clearly and comprehensively described below in conjunction with the accompanying drawings. Apparently, the implementations described herein are only part of the implementations of the present disclosure, but not all of them. All other implementations obtained by those of ordinary skill in the art based on the implementations provided in this application shall fall within the protection scope of the present disclosure.

It is to be understood that, in the description of this application, the orientations or positional relationships indicated by the terms such as "center", "upper", "lower", "front", "rear", "left", "right", "vertical", "horizontal", "top", "bottom", "inner", "outer" are based on the orientations or positional relationships shown in the drawings, and are only for the convenience of describing the application and simplifying the description, rather than indicating or implying the mentioned devices or elements must have particular orientations, be constructed and operate in particular orientations, and therefore should not be construed as limiting the application.

Unless the context requires otherwise, the term "comprising" is interpreted in an open and inclusive sense, i.e., "including, but not limited to", throughout the description and claims. In the description, the terms "one implementation", "some implementations", "exemplary implementations", "exemplarily" or "some examples" are intended to indicate particular features, structures, materials or characteristics associated with the implementations or examples are included in at least one implementation or example of the present disclosure. Schematic representations of the above terms do not necessarily refer to the same implementation or example. Furthermore, the particular features, structures, materials or characteristics described may be included in any one or more implementations or examples in any suitable manner.

Hereinafter, the terms "first" and "second" are used for the purposes of describing only, and cannot be understood as indicating or implying relative importance or implicitly specifying the quantity of the indicated technical features. Thus, a feature defined as "first" and "second" may explicitly or implicitly include one or more of such features. In the description of the implementations of the present disclosure, "plurality" means two or more, unless otherwise specified.

In describing some implementations, the expressions "coupled" and "connected" and their derivatives may be used. For example, the term "connected" may be used in describing some implementations to indicate that two or more elements are in direct physical or electrical contact with each other. As another example, the term "coupled" may be used in describing some implementations to indicate that two or more elements are in direct physical or electrical contact. However, the term "coupled" may also mean that two or more elements are not in direct contact with each other, but still co-operate or interact with each other. The implementations disclosed here are not necessarily limited by the context herein.

"At least one of A, B and C" has the same meaning as "at least one of A, B or C" and both include the following combinations of A, B and C: A only, B only, C only, a combination A and B, a combination of A and C, a combination of B and C, and a combination of A, B and C.

"A and/or B" includes the following three combinations: A only, B only, and a combination of A and B.

The use of "adapted to" or "configured to" herein means open and inclusive language that does not exclude devices that are adapted to or configured to perform additional tasks or steps.

Additionally, the use of "based on" is meant to be open and inclusive, as processes, steps, calculations, or other actions that are "based on" one or more stated conditions or values may in practice be based on additional conditions or beyond stated values.

As used in this application, "about", "substantially" or "approximately" includes the stated value as well as the average value within the acceptable deviation range of the specified value, where the acceptable deviation range is determined by ordinary skill in the art by taking into account the measurement in question and the errors associated with the measurement of a particular quantity (i.e., limitations of the measurement system).

In the context of this application, the meanings of "on", "above", and "over" should be construed in the broadest manner such that "on" does not only mean "directly on something", but also includes the meaning of "on something" with intermediate features or layers in between, and "above" or "over" not only means "above" or "over" something, but also "above" or "over" something without intermediate features or layers in between (i.e., directly on something).

FIG. 1 illustrates a schematic diagram of an exemplary memory device 30 including peripheral circuits 302. The memory device 30 may include a memory cell array 301 and the peripheral circuits 302 coupled to the memory cell array 301. The memory cell array 301 may be a NAND flash memory cell array. In the NAND flash memory cell array, memory cells 306 are arranged in the form of an array of memory strings 308 of NAND memory devices. The memory string 308 of each NAND memory device extends vertically above a substrate (not shown). In some implementations, the memory string 308 of each NAND memory device includes a plurality of memory cells 306 coupled in series and stacked vertically. Each memory cell 306 may hold a continuous analog value, such as a voltage or charge, depending on the number of electrons trapped within the area of the memory cell 306. Each memory cell 306 may be a floating gate type memory cell including a floating gate transistor, or a charge trap type memory cell including a charge trap transistor. Note that the NAND memory device of the present disclosure is only one example of memory device 30 for illustrative purposes. Memory device 30 may include any suitable solid-state, non-volatile storage device, such as NOR flash memory, FeRAM, PCM, MRAM, STT-RAM, or RRAM, among others.

As shown in FIG. 1, each NAND memory string 308 may include a source select gate (SSG) 310 at its source terminal and a drain select gate (DSG) 312 at its drain terminal. SSG 310 and DSG 312 may be configured to activate the selected NAND string 308 (column of the array) during read and program (or write) operations. In some implementations, the sources of NAND memory strings 308 in the same memory block 304 are coupled by the same source line (SL) 314 (e.g., a common SL). In other words, according to some implementations, all NAND memory strings 308 in the same memory block 304 have an array common source (ACS). According to some implementations, the DSG 312 of each NAND memory string 308 is coupled to a corresponding bit line 316, and data can be read from and written into the bit line 316 via an output bus (not shown). In some implementations, each NAND memory string 308 is configured to be selected or deselected by applying a select voltage (e.g., above a threshold voltage of a transistor with DSG 312) or a deselect voltage (e.g., 0V) to the corresponding DSG 312 via one or more DSG lines 313 and/or by applying a select voltage (e.g., above a threshold voltage of a transistor with SSG 310) or a deselect voltage to the corresponding SSG 310 via one or more SSG lines 315.

As shown in FIG. 1, NAND memory strings 308 may be organized into a plurality of memory blocks 304, each of which may have a common source line 314 (e.g., coupled to ground). In some implementations, each memory block 304 is a basic unit of data with an erase operation, i.e., all memory cells 306 on the same memory block 304 are erased simultaneously. To erase the memory cells 306 in the selected memory block 304, an erase voltage Vers (e.g., a high positive voltage of 20V or higher) may be bias coupled to the selected memory block 304 as well as the source lines 314 of the unselected memory blocks 304 on the same plane as the selected memory block 304. It should be understood that, in some examples, an erase operation may be performed at the half-block level, at the quarter-block level, or a level with any suitable number or fraction of blocks. The memory cells 306 of adjacent NAND memory strings 308 may be coupled by a word line 318 that selects which row of memory cells 306 is subject to read and program operations. In some implementations, the memory cells 306 coupled to the same word line 318 are referred to as a memory page 320. The memory page 320 is a basic unit of data for a program or read operation, and the size of one memory page 320 in units of bits may be related to the number of NAND memory strings 308 coupled by word lines 318 in one memory block 304. Each word line 318 may include a plurality of control gates (gate electrodes) at each memory cell 306 in the corresponding memory page 320 and a gate line coupling the control gates.

In some implementations, each memory cell 306 is a single-level cell (SLC) that has two possible data states and can thus store one bit of data. A multi-level cell (MLC) 306 can store two bits of data, a triple-level cell (TLC) 306 can store three bits of data, or a quad-level cell (QLC) 306 can store store four bits of data, or a penta-level cell (PLC) 306.

As illustrated in FIG. 1, memory strings 308 of multiple NAND memory devices may be organized into multiple memory blocks 304. In some implementations, each memory block 304 is the basic unit of data for an erase operation, i.e., all memory cells 306 on the same memory block 304 are erased simultaneously.

Figure 2:
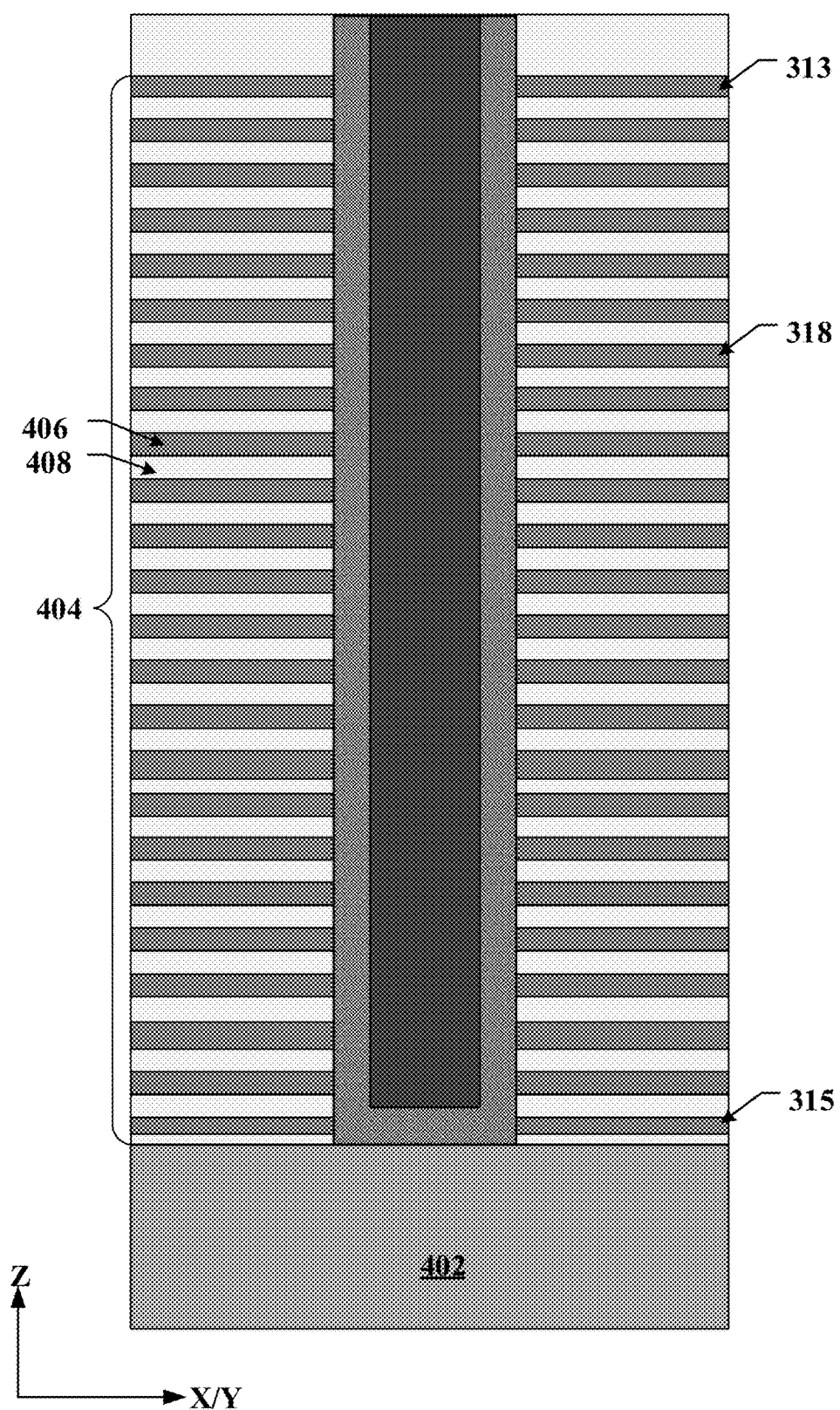
FIG. 2 illustrates a side view of a cross-section of a string of a memory cell array according to some examples.

FIG. 2 illustrates a side view of a cross-section of a memory string 308 an exemplary memory cell array 301 including a NAND memory device, in accordance with some aspects of the present disclosure. As shown in FIG. 2, the memory string 308 of the NAND memory device may extend vertically through stack structure 404 above a substrate 402. The substrate 402 may include silicon (e.g., monocrystalline silicon), silicon germanium (SiGe), gallium arsenide (GaAs), germanium (Ge), silicon on insulator (SOI), germanium on insulator (GOI) or any other suitable materials. The stack structure 404 may include alternating conductive layers 406 and dielectric layers 408. The number of conductive layers 406 and dielectric layers 408 in the stack structure 404 can determine the number of memory cells 306 in the memory cell array 301. Conductive layer 406 may include conductive material including, but not limited to, tungsten (W), cobalt (Co), copper (Cu), aluminum (Al), polysilicon, doped silicon, silicide, or any combination thereof.

Figure 3:
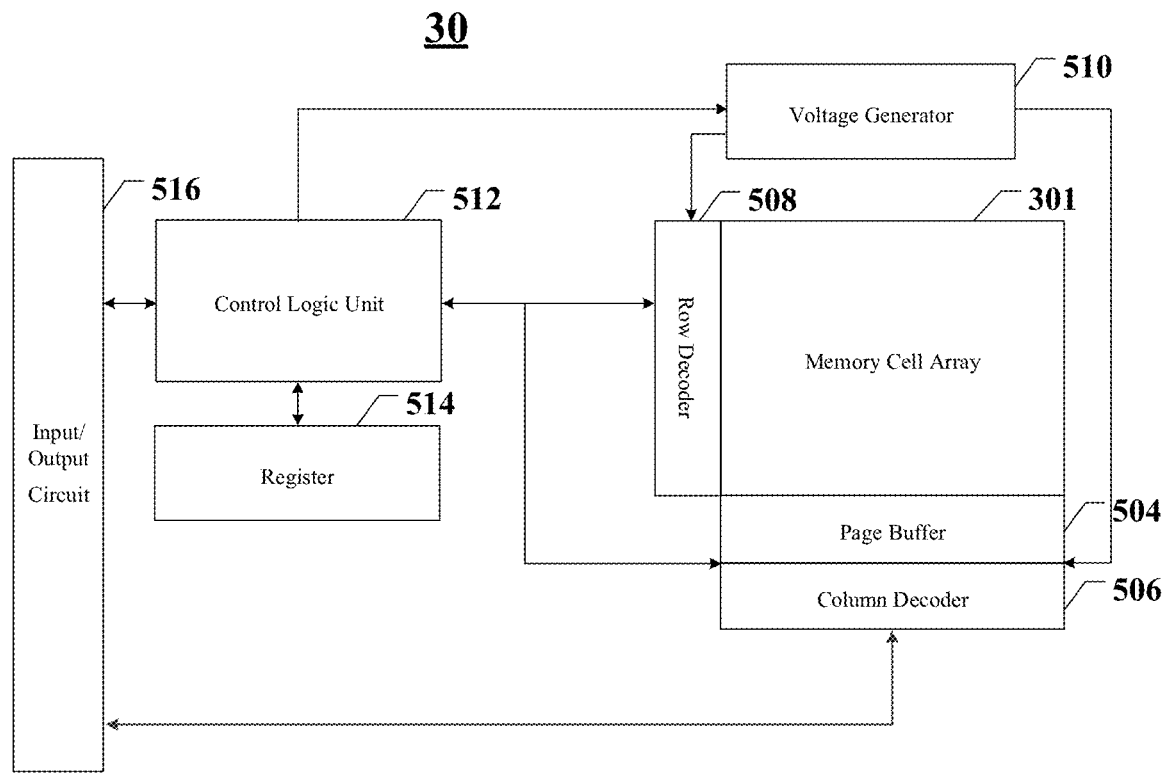
FIG. 3 illustrates a schematic circuit diagram of peripheral circuits in a memory device according to some examples.

FIG. 3 illustrates a schematic circuit diagram of some exemplary peripheral circuits 302 based on the memory cell array 301 shown in FIG. 1. The peripheral circuits 302 include a page buffer 504, a column decoder 506, a row decoder 508, a voltage generator 510, control logic unit 512, register 514, input/output (I/O) circuit 516. It should be understood that, in some examples, additional peripheral circuits not shown in FIG. 3 may also be included. Memory cell array 301 is addressable by word lines via row decoder 508 and by bit lines via column decoder 506. The control logic unit 512 is configured to cooperate with the page buffer 504 to perform store operations on the memory cell array 301. The control logic unit 512 includes a state machine, an on-chip address decoder, and a power control module, where the state machine is configured to provide chip-level control of store operations; the on-chip address decoder is configured to provide an address interface between addresses used by a memory controller of a host or a memory system and hardware addresses used by the column decoder 506 and the row decoder 508. The power control module is configured to control power and voltage supplied to word lines and bit lines during every store operation.

Figure 4:
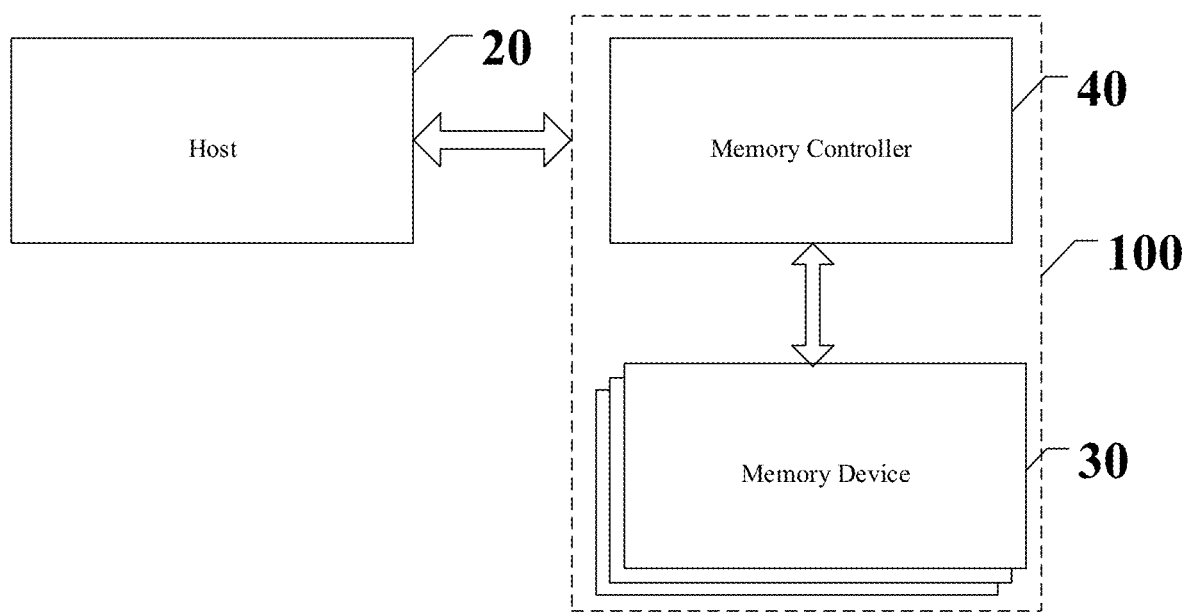
FIG. 4 illustrates a schematic structural diagram of a system according to some examples.

FIG. 4 illustrates a schematic structural diagram of an electronic device 1000. The electronic device 1000 includes a host 20, and external signals and data are transmitted between the host and the memory controller 40 via signal lines. The host 20 may send, to the memory system 100, a command CMD and/or data to be stored in the memory device 30, and may receive, from the memory system 100, a response RES and/or data read from the memory device 30. For example, the host 20 may be implemented as and/or include an application processor (AP) and/or a system on chip (SoC). For example, the host 20 may be implemented as and/or include, but is not limited to, an integrated circuit, a motherboard, and/or a database server.

The host 20 can communicate with the memory system 100 via various interfaces. In some exemplary implementations, the host 20 is electrically connected to the memory system 100 via a hot-swappable interface using a cable. The memory controller 40 may control all operations of the memory system 100. The memory controller 40 may write data to and/or read data from the memory device 30 in response to a command CMD from the host 20.

Figure 5:
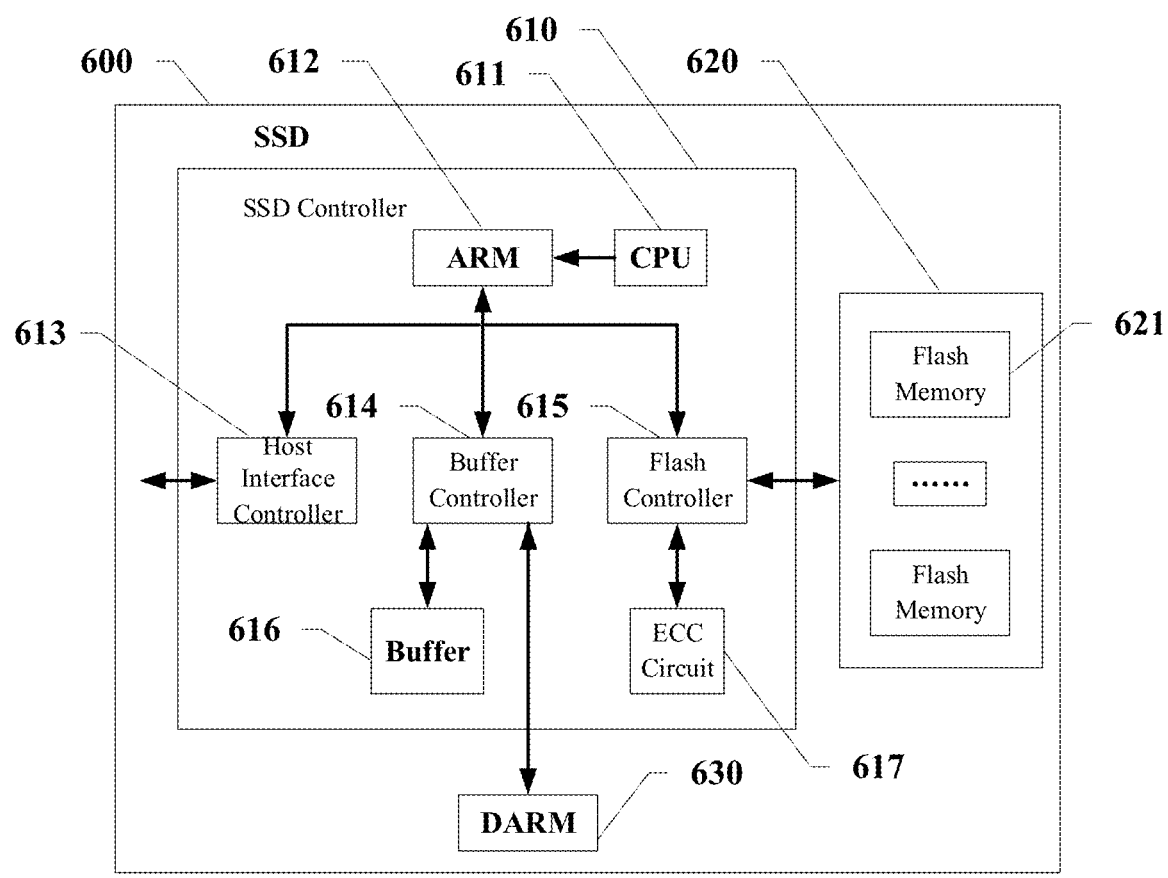
FIG. 5 illustrates a schematic structural view of a solid-state drive according to some examples.

FIG. 5 exemplarily illustrates a schematic structural diagram of a solid state disk (SSD) 600. The solid state disk 600 includes an SSD controller 610, a DRAM 630 and a flash memory device 620, and the flash memory device 620 includes multiple flash memories 621. The memory device 30 may be a flash memory device 620 as shown in FIG. 5, and the memory controller 40 may be an SSD controller 610 as shown in FIG. 5. The SSD controller 610 is an integrated packaged chip (ASIC), in which a CPU 611, an ARM 612, a host interface controller 613, a buffer controller 614, a flash controller 615, a buffer 616, an error correcting code (ECC) circuit 617 are included. The host interface controller 613 interacts with the host 20 as a front end, and the host interface controller 613 may include but is not limited to a PCIe interface, a SATA interface, a SAS interface; the flash controller 615 interacts with the flash memory (FLASH) 613 as a back end and completes data encoding and decoding as well as ECC verification. In addition, the buffer controller 614 is interconnected with an independently-packaged Dynamic Random Access Memory (DRAM) 630 via the AXI bus for data buffering. The data is imported through the host interface, and the buffer controller 614 then applies to the CPU 611 for the permission of the transmission bus, then writes the data into the corresponding address of the DRAM 630, and notifies the flash controller 615. The flash controller 615 takes the data from the DRAM 630 and stores it into the flash memories 621 so that the data storing process is completed.

Figure 6:
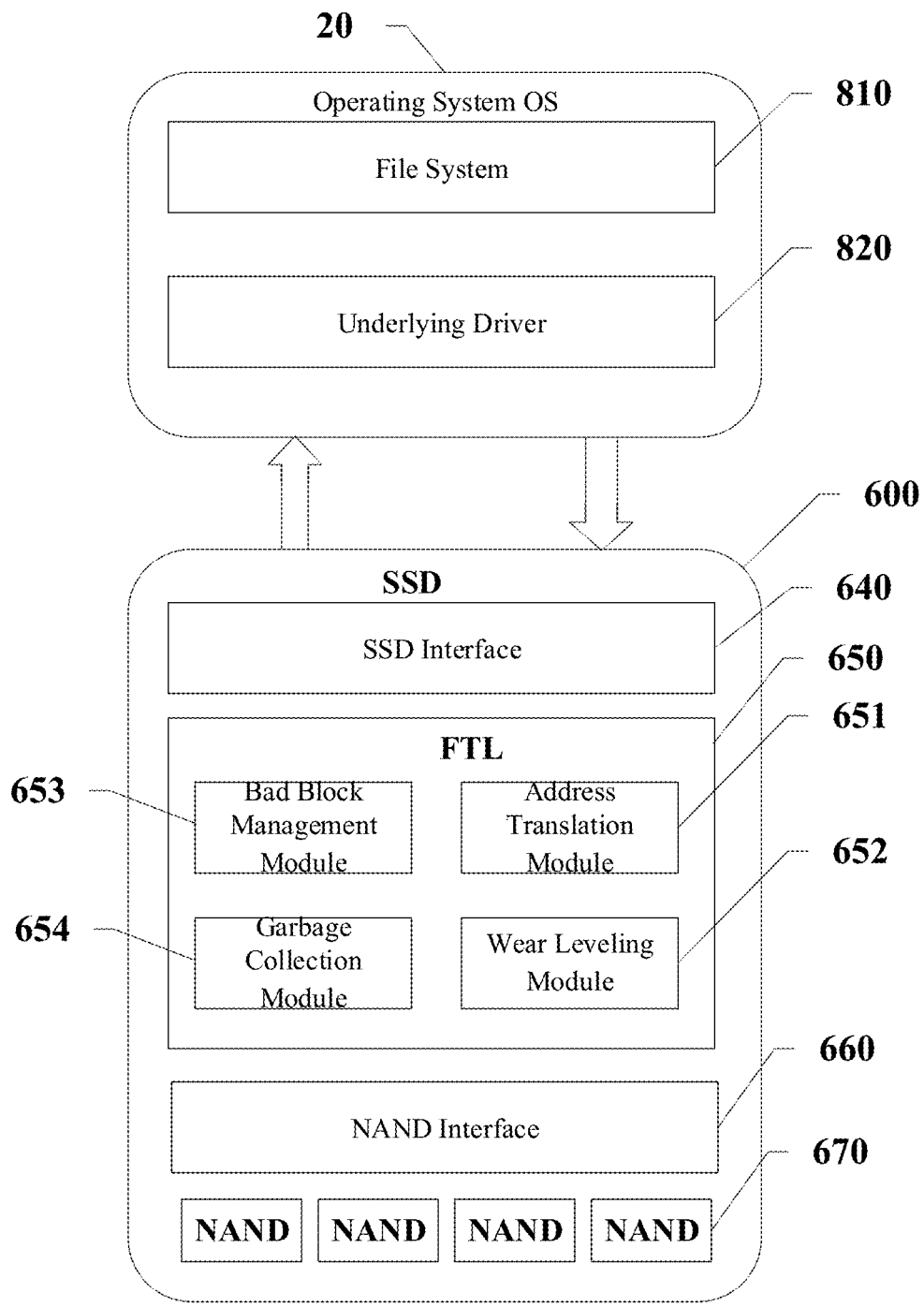
FIG. 6 illustrates a schematic structural diagram of a hosts and a solid-state drive according to some examples.

FIG. 6 exemplarily illustrates a schematic structural diagram of the host 20 and the solid state disk 600. The host 20 supports an operating system OS, and the host 20 includes a file system 810 and an underlying driver 820. The memory system 100 may be a solid state disk (SSD) 600 as shown in FIG. 6, and the solid state disk 600 is a memory system 100 using semiconductor flash memories as a medium. The user sends a request to the solid state disk 600 at the application level of the operating system of the host 20, and the file system 810 converts the read/write request into corresponding read/write and other commands conforming to the protocol through the underlying driver 820. The solid state disk 600 receives the commands via the SSD interface 640 and execute the corresponding operations, and then output the result. The solid state disk 600 mainly includes an SSD interface 640, a flash translation layer (FTL) 650, an NAND interface 660 and a plurality of NANDs 670. At the front end of the solid state disk 600, the SSD interface 640 receives commands and related data sent from the host 20. After the commands are processed by the solid state disk 600, the SSD interface 640 returns command status or data to the host 20 via the SSD interface 640. The SSD interface 640 includes but is not limited to SATA, SAS and PCIe interfaces connected to the host 20 to implement corresponding ATA, SCSI and NVMe protocols. When the host 20 sends a write command to the solid state disk 600 via the SSD interface 640, the solid state disk 600 executes the command after receiving the command, and receives data to be written by the host 20. Data is generally first buffered in the random access memory (RAM) inside the solid state disk 600, and the flash translation layer 650 will allocate a flash memory address for each logical data block. When the data reaches a certain amount, the flash translation layer 650 will send a write flash request to the backend, and the backend will write the data in the random access memory into the corresponding NAND 670 according to the write request.

The solid state disk 600 allocates any possible NAND 670 for writing, for the data blocks sent from the host 20. The flash translation layer 650 is provided with an address translation module 651, which can complete the translation or mapping of logical data blocks to the physical space of the flash memories. Meanwhile, the flash translation layer 650 is further configured with a garbage collection module 654 for erasing invalid data. With the continuous writing of user data, garbage data (invalid data) may be generated in the NAND 670, and can occupy the space of the NAND 670. If there is no enough space available in the NAND 670, the garbage collection module 654 in the flash translation layer 650 can perform garbage collection, that is, move out the valid data on several NANDs 670, write them into a certain new NAND 670, and then erase these previously-used NANDs 670 to obtain available flash blocks. The flash translation layer 650 further includes a wear leveling module 652 to ensure balanced writing of each NAND 670, and a bad block management module 653 to implement bad block management. The bad block management module 653 can implement management of bad blocks in multiple NANDs 670.

The solid state disk 600 can be NAND Flash, and there is an ECC circuit 617 in the SSD controller 610. Based on error correction code, the ECC circuit 617 generates error correction codes for data stored in the memory device 30, or detects errors in data read from the flash memory device 620 for correcting. When NAND Flash is in the power-on state, the FTL 650 will periodically scan the already-written block, that is, memory block 304, and the SSD controller 610 is designed to generate a refresh command according to the fbc (acronym for failed bit count) or bit error rate of the data read from the flash memory device 620. Specifically, the ECC circuit 617 includes at least a decoder, an error counter, and a refresh control circuit. The decoder is configured to receive data and corresponding parity codes from the memory device, and use the corresponding parity codes to perform decoding operation on the data to generate decoded data, where the data and the corresponding parity codes may be read in response to a read command sent by the SSD controller 610. In the process of decoding data, the decoder can know which bit of the received data has an error, and once an error bit is found, the decoder notifies the error counter. The error counter is configured to generate error bit information to the refresh control circuit, according to the error bit count found by the decoder, where the error bit information may be the error bit count in a past period of time, or the bit error rate of data.

The ECC circuit 617 can detect and correct errors smaller than the error correction capability, and the ECC circuit 617 cannot detect or correct errors beyond the error correction capability. The data with error that cannot be corrected by the ECC circuit 617 belongs to UECC (acronym for Uncorrectable Error Correcting Code). The data with error that can be corrected by the ECC circuit 617 belongs to CECC (acronym for Correctable Error Correcting Code). Data of correctable error correcting code is further classified as data whose error is correctable by the ECC circuit 617 and for which the error bit count of the memory block 304 is greater than a specific value, called High Error Correcting Code (HECC) data.

ECC decoding operation may include hard decoding operation and soft decoding operation. The error correction mechanism of the ECC circuit 617 is to first perform hard decoding operation by hard decoder and then perform soft decoding operation by soft decoder. That is, when the hard decoding operation fails, the soft decoding operation is performed. In a word, when the degree of data corruption is high, errors in the data to be restored cannot be completely corrected only by conventional read error correction. In this case, the SSD controller 610 can read the data to be restored multiple times repeatedly, by using different read threshold voltages, and use the hard decoding function of the error correction code to perform decoding and error correction. When the data is seriously corrupted, it may not be possible to correct the data through repeated reading and hard decoding several times. In this case, the SSD controller 610 may perform soft decoding operation to restore data. Both the hard decoding operation and the soft decoding operation can be iterated within the maximum iteration count, until the ECC decoding operation succeeds.

Figure 7:
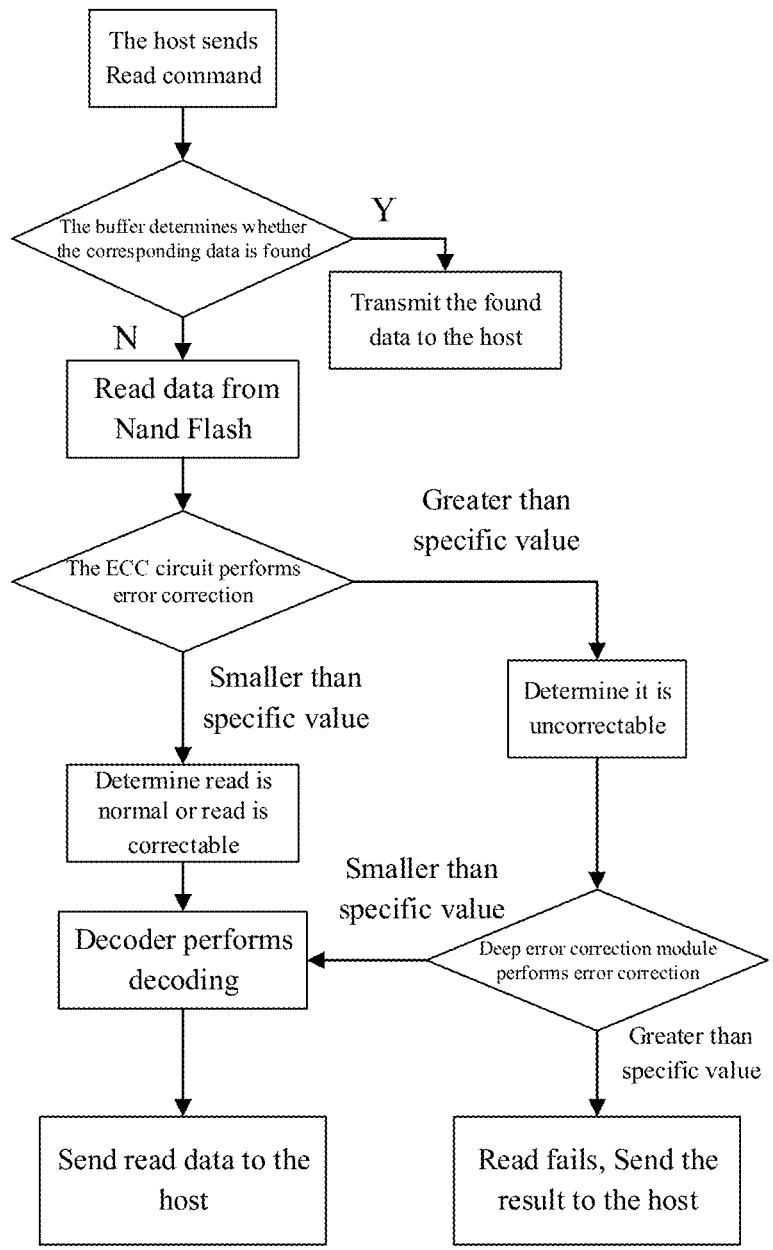
FIG. 7 illustrates a schematic flow chart of reading data by a host according to some examples.

FIG. 7 exemplarily illustrates the process of reading data by the host 20. The host 20 sends a read command to the memory system 100. The buffer in the memory system 100 receives the read command and searches for the data corresponding to the read command. If found, the buffer transmits the found data to the host 20. If not found, the data is read from the NAND Flash, and then the ECC circuit 617 performs an error correction process. If the error bit count of the memory block 304 is greater than a specific value, it means that the bit error rate of data of the memory block 304 is high, and it is determined that it is uncorrectable, belonging to UECC, and a deep error correction module is used to perform error correction. If the error bit count of the memory block 304 is still greater than a specific value, then the reading fails and the result is sent to the host 20. If the error bit count of the memory block 304 is less than a specific value, it means that the data bit error rate of the memory block 304 is low, and it is determined that it is correctable, belonging to CECC, or can be read normally, and the decoder performs decoding and sends the read data to the host 20.

Figure 8:
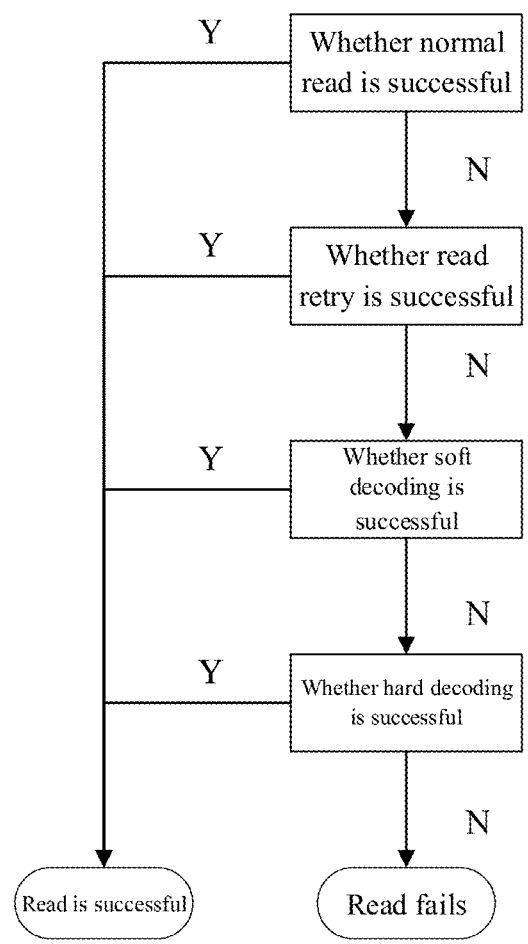
FIG. 8 illustrates a schematic flow chart of error correction performed by a ECC circuit according to some examples.

FIG. 8 exemplarily illustrates the process of error correction performed by the ECC circuit 617. The ECC circuit 617 determines whether the normal read is successful. If the normal read is successful, the ECC circuit 617 reads successfully. If the normal read is unsuccessful, read retry is carried out, and it is determined whether the read retry is successful. If the read retry is successful, then the ECC circuit 617 reads successfully. If the read retry is unsuccessful, soft decoding is performed by the soft decoder to determine whether the soft decoding is successful. If the soft decoding is successful, then the ECC circuit 617 reads successfully. If the soft decoding is unsuccessful, hard decoding is performed by the hard decoder to determine whether the hard decoding is successful. For example, Redundant Arrays of Independent Disks (RAID) parity check restores data by implementing hard decoding. If the hard decoding is successful, then the ECC circuit 617 reads successfully. If the hard decoding is unsuccessful, it is finally determined that the ECC circuit 617 fails to read, belonging to UECC, and the memory block 304 belonging to UECC needs to be refreshed.

The memory cell array 301 in the memory system discussed above can be erased, programmed and read. A memory cell 306 in the memory system can be arranged as a single-level cell or a multi-level cell, and a multi-level cell can be further divided into a multi-level cell MLC, a triple-level cell TLC, a quad-level cell QLC, or the like. Therefore, for a memory page, at the end of a successful programming process (with verification), the threshold voltages of the programmed memory cells 306 should be within one or more distributions. In practical applications, different types of memory cells 306 have different data states.

As the capacity of NAND Flash increases, the corresponding number of data bits stored in a memory cell 306 also increases. That is, for SLC-*MLC-*TLC-*QLC-*PLC, the number of threshold voltage distributions corresponding to different data states is increasing. The multiple data states include an erased state and 2N-1 programmed states, where N is the number of bits of data that the memory cell 306 stores at most. As the capacity of NAND Flash increases, the amount of data stored in the memory cell 306 increases, so it is necessary to continuously enhance data protection capability to improve data reliability. The ECC circuit 617 detects and corrects the data read from the memory cells 306 using an error correction algorithm including but not limited to BCH and LDPC based on RRT (acronym for Read retry table). The RRT with a high fitness can not only enhance the data protection capability but also improve the performance of reading data in the memory cells. Therefore, if the fitness of the RRT used by the ECC circuit 617 is not high, the workload of the soft decoder is increased and the reading performance is reduced.

Figures 9, 10:
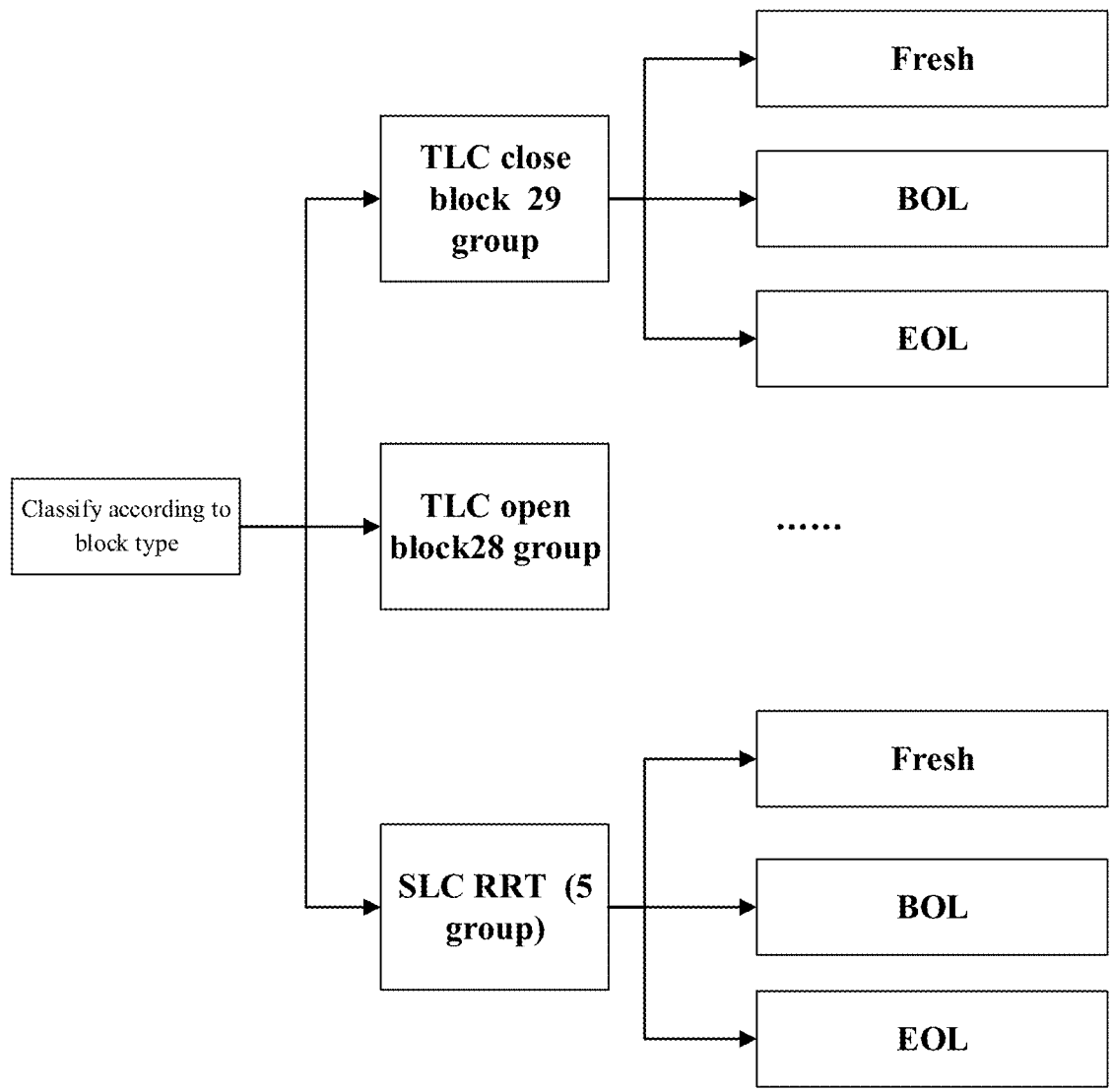
FIG. 9 illustrates a schematic flow chart of index searching for read bias group using an index order of programming mode and/or stored amount→period of life cycle.
FIG. 10 illustrates a schematic flow chart of an operation method for a memory system according to some examples.

The read retry table can include but not limited to the following index parameters: programming mode (including single-level storage status and multi-level storage status); stored amount (including multi-stage full storage status (close) or multi-stage under-full storage status (open)); test item; period of life cycle that the number of erase cycles of the memory block belongs to (including but not limited to an initial stage, an early stage and an end stage). As shown in FIG. 9, the memory controller first uses an index order of programming mode and/or stored amount→period of the life cycle to perform index searching, to read bias group for read retry. In this manner, The number of read retries cannot be effectively reduced due to poor fitness.

A schematic flowchart of an operation method for a memory system according to an exemplary implementation as shown in FIG. 10 is further disclosed by the present disclosure. The memory controller is configured to control a memory device including a plurality of memory blocks for storing data. The memory controller is configured to execute the process shown in FIG. 10. For example, the operation method of the memory system includes steps S100 and S200

At step S100, when reading fails, the memory controller searches for a read retry table corresponding to the range to which number of erase cycles of the memory block belongs, according to the number of erase cycles. The read retry table includes a plurality of read bias groups.

In some examples, when a read request is received from the host, the memory controller may generate a normal read command for reading data from the specified read memory block requested to be read, and provide the normal read command to the memory device. The normal read command may refer to a read command for performing a read operation based on a preset initial read voltage. The memory controller may utilize the initial read voltage to perform a normal read operation on the memory block designated for reading. The normal read operation refers to a read operation performed using an initial read voltage. The memory device may read data by performing the normal read operation on the memory block designated for reading in response to the normal read command provided from the memory controller, and transmit the normal read data to the memory controller. The memory controller may control the ECC circuit 617 to decode the normal read data received from the memory device, to correct errors included in the received normal read data. When the decoding of the normal read data is successful, the normal read operation is successful, and the memory controller may transmit the error-corrected normal read data to the host.

When the decoding of the normal read data fails, the normal read operation fails, and the memory controller may generate a read retry command for reading data from the specified read memory block requested to be read, and provide the read retry command to the memory device. The read retry command may refer to a read command for performing a read operation based on the retry read voltage. The memory controller may perform a read retry operation on the memory block designated for reading, by using a retry read voltage different from the initial read voltage. The read retry operation refers to a read operation performed using the retry read voltage different from the initial read voltage after a normal read operation. The retry read voltage is different from the initial read voltage. In the operation example, if the read retry operation is successful, the memory controller stores the retry read voltage as the historical read voltage.

Since there are many read bias groups in the read retry table, if they are arranged improperly, it may take a long time for the memory device to obtain the most suitable read bias group to perform the read retry operation so as to read data correctly upon a read retry. If the retry read voltages in the most suitable read bias group cannot be obtained for a long time for performing read retry operations, the read latency time of the memory device is greatly increased. Or, when the memory device performs read retry, it may happen that the read time is too long, resulting in a timeout, and the reading cannot be successful. In some examples, read failures include normal read operation failure, and read retry operation failure.

When the reading fails, the memory controller of the present disclosure searches for the read retry table corresponding to the range to which the number of erase cycles of the memory block belongs, according to the number of erase cycles. The following describes how to perform index searching for the read retry table corresponding to at least the range of the number of erase cycles, with the number of erase cycles.

In some implementations, the number of erase cycles is classified, according to the number of erase cycles of the plurality of memory blocks, into an initial stage, an early stage, and an end stage.

In some examples, the memory controller can divide according to the number of erase cycles of the memory block that is designated for reading, and the number of divided periods can be set arbitrarily. For example, it is classified into an early stage and an end stage. As another example, it is classified into an initial stage, an early stage, a late stage, and an end stage. The initial stage is the earliest period in the life cycle of the memory block that is designated for reading. The early stage is a period after the earliest period in the life cycle of the memory block that is designated for reading. The later stage is a period after the early stage in the life cycle of the memory block that is designated for reading. The end stage is the last period in the life cycle of the memory block that is designated for reading. The life cycle in this implementation may be an average value of life cycles of multiple memory blocks in the same memory cell or storage string. In accordance with the present disclosure, the number of erase cycles of a plurality of memory blocks is classified to obtain the initial stage, the early stage and the end stage. In this way, compared to the case where the number of divided periods is two, the number of read bias groups is more and finer, which can improve the fitness of the read bias group found by the index searching. For the case where the number of divided periods is at least four, the efficiency of index searching for the optimal read bias group is reduced although the number of read bias groups is more and finer. Therefore, in accordance with the present disclosure, the number of erase cycles is classified into the initial stage, the early stage, and the end stage, which can not only improve the efficiency of the index searching for the optimal read bias group, but also improve the fitness of the read bias group found by the index searching. In accordance with the present disclosure, entries of multiple read bias groups are formed according to correspondence between EC classification option, i.e., classified as the initial stage Fresh, the early stage BOL and the end stage EOL according to the number of erase cycles, as well as storage status (including lower page, middle page and upper page corresponding to different programming states), stored amount, test item, and values (mv) of the read voltage parameter, as shown in FIG. 12, FIG. 13 and FIG. 14.

In some implementations, the memory controller is further configured to:

fetch a read retry table corresponding to storage status of the memory block within the range to which the number of erase cycles belongs, according to the storage status.

In some examples, when the normal read operation or the previous read retry operation fails, the memory controller can first perform preliminary screening on multiple read retry tables to obtain the preliminary screening result according to the type of the period (including the initial stage, the early stage, and the end stage) in which the number of erase cycles lies. Thereafter, the memory controller further performs a second screening on the preliminary screening result according to the storage status of the memory block. The storage status may include, but is not limited to, the programming mode and the stored amount mentioned in the following implementations.

In some implementations, the storage status is classified into single-level storage status and multi-level storage status according to the programming mode of the memory block.

In some examples, programming mode of the memory block may include, but are not limited to, SLC, MLC, TLC, QLC, and PLC. Among them, the single-level storage status refers to the SLC storage status, and the multi-level storage status includes but not limited to the MLC storage status, the TLC storage status, the QLC storage status, the PLC storage status.

In accordance with the present disclosure, when the normal read operation or the previous read retry operation fails, the memory controller can first perform preliminary screening on multiple read retry tables to obtain the preliminary screening result according to the type of the period in which the number of erase cycles lies, and then the memory controller performs a second screening on the preliminary screening result according to the programming mode of the memory block.

In some implementations, the multi-level storage status further includes multi-stage full storage status and multi-stage under-full storage status that are obtained by classifying according to the stored amount of the memory block.

In some examples, since the memory includes a plurality of memory blocks of a predetermined capacity, the memory controller may detect each memory block in the memory device before performing a programming operation on the memory device, so as to obtain capacity information of each memory block, where the capacity information includes the total amount of space, the amount of remaining space, and the amount of occupied space. The multi-stage full storage status (close) indicates that the amount of remaining space of the memory block is zero, and no new data can be stored therein or written thereto, so that the memory block will be in the close state to prevent the memory controller from continuing writing data into the memory block in the multi-stage full storage status. In contrast, the multi-stage under-full storage status (open) indicates that the amount of remaining space of the memory block is not zero, and new data can still be stored therein or written thereto, so the memory block will be in an open state to allow the memory controller to continue writing data into the memory block in the multi-stage full storage status. During use, the amount of occupied space of the memory block, i.e., the stored amount, is increasing over time. The multi-level storage status can be classified into multi-stage full storage status (close) and multi-level under-full storage status (open), according to the amount of occupied space of the memory block, i.e., the stored amount.

According to the present disclosure, when the normal read operation or the previous read retry operation fails, the memory controller can first perform preliminary screening on multiple read retry tables to obtain the preliminary screening result according to the type of the period in which the number of erase cycles lies, and then the memory controller performs a second screening on the preliminary screening result according to the stored amount of the memory block.

Alternatively, when the normal read operation or the previous read retry operation fails, the memory controller can first perform preliminary screening on multiple read retry tables to obtain the preliminary screening result according to the type of the period in which the number of erase cycles lies, then the memory controller performs a second screening on the preliminary screening result according to the programming mode of the memory block, and then the memory controller further performs a third screening on the result after the second screening according to the stored amount of the memory block.

In some implementations, the memory controller is further configured to:
fetch a read retry table corresponding to a test item within the range to which the number of erase cycles belongs, according to the test item of the memory block.

In some examples, the test items refer to items of performance test for a memory block of a memory device, and the test items include, but are not limited to, Postcycling High Temperature data (PCHTDR), block Read data (BLK RD), High and low temperature Write/Read data (X-temp), Uncycled High Temperature Data (UCHTDR), Cycling Endurance (NVCE), Low Temperature Retention and read disturbance (LTDR).

According to the present disclosure, when the normal read operation or the previous read retry operation fails, the memory controller can first perform preliminary screening on multiple read retry tables to obtain preliminary screening result according to the type of the period in which the number of erase cycles lies, then the memory controller performs a second screening on the preliminary screening result according to the programming mode of the memory block, and then the memory controller further performs a third screening on the result after the second screening according to the test item of the memory block.

Figure 11:
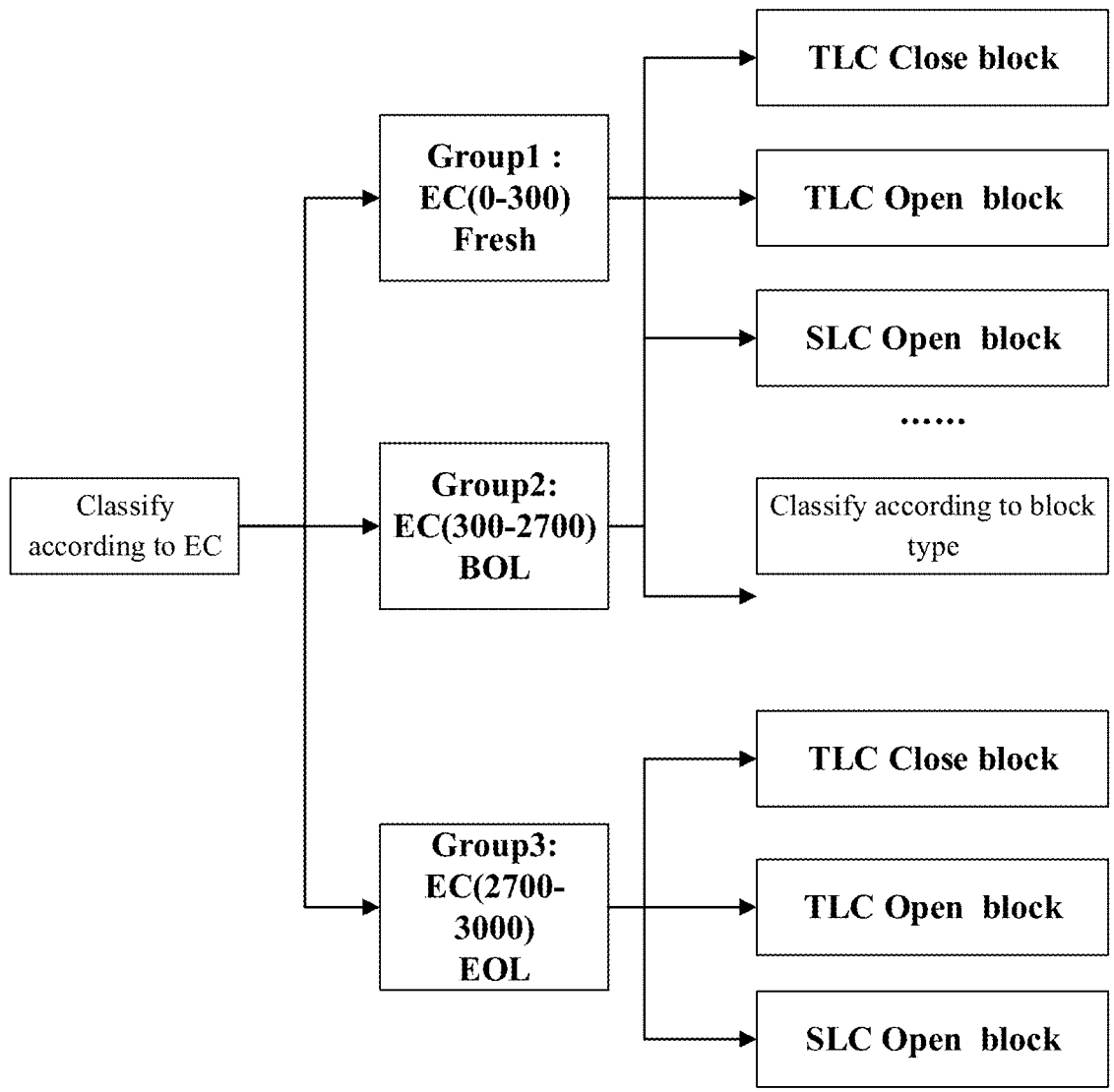
FIG. 11 illustrates a schematic flow chart of index searching for read bias group using an index order of programming mode and/or stored amount→period of life cycle.

Alternatively, as illustrated in FIG. 11, when the normal read operation or the previous read retry operation fails, the memory controller can first perform preliminary screening on multiple read retry tables to obtain preliminary screening result according to the type of the period in which the number of erase cycles lies, then the memory controller performs a second screening on the preliminary screening result according to the programming mode of the memory block, and then the memory controller further performs a third screening on the result after the second screening according to the stored amount of the memory block. Finally, the memory controller further performs a fourth screening on the result after the third screening according to the test item of the memory block.

According to the present disclosure, multi-direction and multi-condition screening are performed through different index sequences that are progressive step by step, which can reduce the number of read retry tables found by the index searching, thus improving the efficiency of index searching for the optimal read bias group. The fitness of the read bias group found by the index searching can also be improved.

In some implementations, the memory controller is further configured to:
search for a read retry table corresponding to a range to which an average value of multiple numbers of erase cycles of a plurality of memory blocks belongs, according to the average value of the multiple numbers of erase cycles, when the reading fails.

In some examples, when the reading fails, the memory controller can obtain multiple numbers of erase cycles of a plurality of memory blocks, and perform an average calculation on the multiple numbers of erase cycles of the plurality of memory blocks to obtain the average value of the multiple numbers of erase cycles. Then, the memory controller searches for the read retry table corresponding to the range to which the average value of the multiple numbers of erase cycles belongs, so that the read bias group included in the read retry table found based on the average value of the multiple numbers of erase cycles has a larger range of retry read voltages, thereby improving the efficiency of index searching for the optimal read bias group, and also improving the fitness of the read bias group found by the index searching.

In some implementations, the read bias group includes read voltage parameters for different word lines.

In some examples, the memory block 304 includes a plurality of NAND memory strings 308, each NAND memory string 308 includes a plurality of word lines 318 and memory cells 306. The word line 318 selects which row of memory cells 306 is to be read and programmed. Therefore, the plurality of word lines 318 in the memory block 304 correspond to read voltage parameters of different memory cells 306. Read voltage parameters may include read retry voltage and initial read voltage.

The memory controller selects, as a target word line, at least one word line in a plurality of memory blocks for which data reading is successful according to the read voltage parameters, and utilizes target memory cells corresponding to the target word line to determine the optimal read bias group of the target memory cells. The so-called optimal read bias group means that the largest amount of correct data can be read and the success rate is the highest, by using the reading voltage parameters of this group.

At step S200, the memory controller performs read retry operations on the memory block according to the plurality of read bias groups in the read retry table.

In some examples, after the memory controller finds the read retry table by index searching in the above implementation, it fetches a plurality of read bias groups in the found read retry table, and the memory controller controls the voltage generator 510 to generate the retry read voltages corresponding to the plurality of read bias groups, according to the plurality of read bias groups in the found read retry table, and performs the read retry operations on the memory block.

In some implementations, the memory controller is further configured to:
search for a read retry table cluster corresponding to the range to which the number of erase cycles belongs; and
sequentially load, based on a sequential order of storage arrangement of a plurality of read retry tables in the read retry table cluster, the read retry tables in the read retry table cluster to perform read retry operations.

In some examples, since the number of erase cycles may be a value or a range of values, the memory controller may find a read retry table cluster including a plurality of read retry tables according to the number of erase cycles. The original sequential order of storage arrangement may be the sequential order of storage time stored in the DRAM 630. If the memory controller finds the read retry table cluster, it then sequentially load the plurality of read retry tables in the read retry table cluster for read retry operations according to the original sequential order of storage arrangement of the plurality of read retry tables in the read retry table cluster. In some implementations, the memory controller is further configured to:
search for a read retry table cluster corresponding to the range to which the number of erase cycles belongs; and
sequentially load, based on a sequential order of most-recently-use time of a plurality of read retry tables in the read retry table cluster, the read retry tables in the read retry table cluster to perform the read retry operations.

In some examples, if the memory controller finds the read retry table cluster and directly performs the read retry operations according to the original sequential order of storage arrangement of the plurality of read retry tables in the read retry table cluster, there is a high probability that the read failure will occur. Therefore, as shown in FIG. 15, the least recently used (LRU) algorithm is employed to adjust the order of the plurality of read retry tables in the read retry table cluster, to improve the success rate of read error retries. Actually, LRU means the read retry table that is most recently read successfully is placed at the foremost position. It is noted that each of the lower page, middle page, and upper page of each memory cell manages the read retry table separately. In this implementation, the read retry table in the read retry table cluster, for which the reading is most likely to be successfully, is placed at the foremost position based on the LRU algorithm.

In some implementations, a read bias group of a plurality of read bias groups in each read retry table, for which the reading is most likely to be successfully based on LRU, is placed at the foremost position.

Read errors on the same memory block 304 in the memory cell array 301 generally have a high degree of similarity. Thus, the most-recently-used read retry table or read bias group that resulted in a successful retry read has a much higher probability of success from the perspective of statistics. In accordance with the present disclosure, the memory controller follows the LRU algorithm to dynamically adjust and update the sequential order of storage arrangement of the plurality of read retry tables in the read retry table cluster, and according to the sequential order of storage arrangement of the plurality of read retry tables in the read retry table cluster that is dynamically adjusted and updated by the LRU algorithm, loads the read retry tables in the read retry table cluster sequentially to perform read retry operations. In this way, the sequential order of storage arrangement of the plurality of read retry tables in the read retry table cluster is dynamically updated in time, instead of being static tables.

As illustrated in FIG. 15, the memory controller first reads according to the read table of the initial read voltages corresponding to a plurality of initial read tables in the initial read table cluster. Then, if the reading fails, the memory controller will update the plurality of read retry tables in the read retry table cluster based on the initial read table cluster. Exemplarily, the initial read table cluster includes 55 initial read tables Table1 to Table55, and the read retry table cluster includes 55 read retry tables Table1 to Table55. In accordance with the present disclosure, the order of multiple tables Table1 to Table55 in the read retry table cluster is adjusted based on the least recently used (LRU) algorithm.

It should be noted that the memory controller deletes or removes the oldest or earliest read retry table in the read retry table cluster. Alternatively, the memory controller deletes or removes the oldest or earliest read bias group in the read retry table.

In some implementations, the memory controller is further configured to:
search for a read retry table cluster corresponding to the range to which the number of erase cycles belongs; and
sequentially load, based on a sequential order of read success degrees for a plurality of read retry tables in the read retry table cluster upon performing read operations, the read retry tables in the read retry table cluster to perform read retry operations.

In some examples, if the memory controller finds the read retry table cluster and directly performs the read retry operations according to the original sequential order of storage arrangement of the plurality of read retry tables in the read retry table cluster, there is a high probability that the read failure will occur. Therefore, the first count value of read success and the second count value of read failure for each read retry table in the read retry table cluster upon performing read operations are acquired, as illustrated in FIG. 15. Then, the first count value is divided by a total count value to obtain the read success degree or read hit rate of each of the read retry tables, where the total count value is equal to the sum of the first count value and the second count value. Thereafter, the memory controller sorts the plurality of read retry tables in the read retry table cluster according to the order of their corresponding success degrees from high to low. In other words, the read retry table with the highest success degree in the read retry table cluster is placed at the foremost position. Then, the memory controller sequentially selects a read retry table from the read retry table cluster in order from the highest success degree to the lowest success degree, to perform the read retry operations.

In accordance with the present disclosure, the read retry table corresponding to the range to which the number of erase cycles of the memory block belongs may be found by the index searching with the number of erase cycles, based on the retry read voltages in the optimal read bias group that the memory device has had initially, so that the read bias group included in the read retry table found by the index searching has a higher fitness. Thus, the memory controller performs the read retry operations on the memory block that is designated for reading, based on the retry read voltages in the read bias group with a higher fitness, which can reduce the number of read retry performed during processing of the host read operations, so as to avoid performance degradation of the memory device, thereby improving the service life of the memory device.

In some other implementations, a memory system is further provided in the implementations of the present disclosure, including:
a memory device including a plurality of memory blocks for storing data, the memory block including a plurality of memory cells; and,
a memory controller for controlling the memory device, the memory controller being configured to:
search for a read retry table corresponding to a range to which the number of erase cycles of the memory block belongs according to the number of erase cycles, when the reading fails, the read retry table including a plurality of read bias groups; and
perform read retry operations on the memory block according to the plurality of read bias groups in the read retry table.

When the reading fails, the memory controller of the present disclosure searches for the read retry table corresponding to the range to which the number of erase cycles of the memory block belongs, according to the number of erase cycles, and performs the read retry operations on the memory block with retry read voltages of the plurality of read bias groups in the read retry table. In accordance with the present disclosure, the read retry table corresponding to the range to which the number of erase cycles of the memory block belongs may be found by the index searching with the number of erase cycles, based on the retry read voltages in the optimal read bias group that the memory device has had initially, so that the read bias group included in the read retry table found by the index searching has a higher fitness. Thus, the memory controller performs the read retry operations on the memory block that is designated for reading based on the retry read voltages in the read bias group with a higher fitness, which can reduce the number of read retry performed during processing of the host read operations, so as to avoid performance degradation of the memory device, thereby improving the service life of the memory device.

In accordance with the present disclosure, RRT is classified according to Fresh/BOL/EOL as the root directory, or further classified in each root directory according to the number of erase cycles (or an average value of the numbers of erase cycles), and then classified into open/close according to the stored amount of the memory block. In this way, the read retry table is further refined, so that the read retry table found by the number of erase cycles (or the average value of the numbers of erase cycles) in the current period has a higher fitness.

The wear leveling function of FTL (flash translation layer) allows the difference between the numbers of erase cycles (or the average value of the numbers of erase cycles) of all memory blocks not too large. The present disclosure is applicable to the small difference in the numbers of erase cycles (or the average value of the numbers of erase cycles), and then finds the read retry table with the highest fitness by the number of erase cycles (or the average value of the numbers of erase cycles).

In accordance with the present disclosure, the optimal read retry table is found according to each test item, stored amount, and programming type corresponding to the range of the number of erase cycles in different periods, and further the read bias group with the highest fitness is found. In addition, the most suitable previous read retry table is found in the read retry table cluster based on the LRU, and the most suitable set of read bias groups is placed at the foremost positon in the most suitable read retry table, and read retry operations are performed rather than polling for all read bias groups. Therefore, even if the number of read bias groups in each read retry table is increased, the read time will not be increased. Compared to error correction by a soft decoder, it takes less time and is faster. In addition, the error correction by the soft decoder cannot necessarily find the best read bias group. According to the present disclosure, read retry operations are performed on a memory block designated for reading based on the retry read voltages in the read bias group with a higher fitness, which can reduce the number of read retry performed during processing of the host read operations, so as to avoid performance degradation of the memory device, thereby improving the service life of the memory device.

In some other implementations, an operation method for a memory system is further provided by the implementations of the present disclosure. The memory system includes a memory device and a memory controller; the memory device includes a plurality of memory blocks for storing data, the memory block includes a plurality of memory cells, the memory controller is configured to control the memory device, and the operation method includes the steps of:

searching, by the memory controller, for a read retry table corresponding to a range to which the number of erase cycles of the memory block belongs according to the number of erase cycles, when the reading fails, the read retry table including a plurality of read bias groups; and performing, by the memory controller, read retry operations on the memory block according to the plurality of read bias groups in the read retry table.

In some implementations, the number of erase cycles is classified into an initial stage, an early stage, and an end stage according to the number of erase cycles of the plurality of memory blocks.

In some implementations, the operation method for the memory system further includes the step of:

fetching, by the memory controller, a read retry table corresponding to storage status of the memory block within the range to which the number of erase cycles belongs, according to the storage status.

In some implementations, the storage status is classified into single-level storage status and multi-level storage status according to the programming mode of the memory block. The multi-level storage status further includes multi-stage full storage status and multi-stage under-full storage status that are obtained by classifying according to the stored amount of the memory block.

In some implementations, the operation method for the memory system further includes the steps of:

searching for a read retry table cluster corresponding to the range to which the number of erase cycles belongs; and sequentially loading, based on a sequential order of storage arrangement of the plurality of read retry tables in the read retry table cluster, the read retry tables in the read retry table cluster to perform the read retry operations.

In some implementations, the operation method for the memory system further includes the steps of:

searching for a read retry table cluster corresponding to the range to which the number of erase cycles belongs; and sequentially loading, based on a sequential order of most-recently-use time of the plurality of read retry tables in the read retry table cluster, the read retry tables in the read retry table cluster to perform the read retry operations.

In some implementations, the operation method for the memory system further includes the steps of:

searching for a read retry table cluster corresponding to the range to which the number of erase cycles belongs; and sequentially loading, based on a sequential order of read success degrees for the plurality of read retry tables in the read retry table cluster upon performing read operations, the read retry tables in the read retry table cluster to perform the read retry operations.

When the reading fails, the memory controller of the present disclosure searches for the read retry table corresponding to the range to which the number of erase cycles of the memory block belongs, according to the number of erase cycles, and performs the read retry operations on the memory block with retry read voltages of the plurality of read bias groups in the read retry table. In accordance with the present disclosure, the read retry table corresponding to the range to which the number of erase cycles of the memory block belongs may be found by index searching with the number of erase cycles, based on the retry read voltages in the optimal read bias group that the memory device has had initially, so that the read bias group included in the read retry table found by the index searching has a higher fitness. Thus, the memory controller performs the read retry operations on the memory block that is designated for reading based on the retry read voltages in the read bias group with a higher fitness, which can reduce the number of read retry performed during processing of the host read operations, so as to avoid performance degradation of the memory device, thereby improving the service life of the memory device.

The memory system 100 can be integrated into various types of storage devices, for example, included in the same package (for example, Universal Flash Storage (referred to as UFS) package or Embedded Multimedia Card (referred to as eMMC) package). That is to say, the memory system 100 can be applied and packaged into different types of electronic products, for example, at least one of data servers, network-attached storage, Internet of Things (IoT) devices, or portable electronic devices. Portable electronic devices may include mobile phones (such as cell phones), personal computers (PCs), desktop computers, tablets, laptops, servers, in-vehicle devices, game consoles, printers, pointing devices, wearable devices, smart sensors, power banks, enterprise digital assistant (EDA), digital still cameras, digital video cameras, audio devices, portable multimedia players (PMP), personal navigation devices (PND), MP3 players, handheld game consoles, e-books, virtual reality (referred to as VR) devices, augmented reality (referred to as AR) devices, or any other suitable electronic device having a memory device therein.

Figure 16:
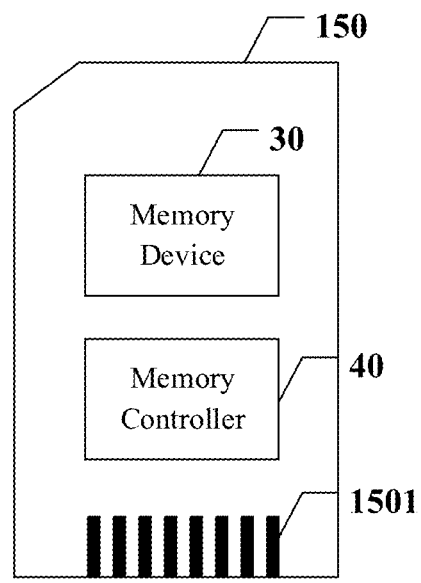
FIG. 16 illustrates a schematic diagram of an exemplary device card of semiconductor technology field with a device system of semiconductor technology field according to some aspects provided in the present disclosure.

In some examples, as shown in FIG. 4, the memory system 100 includes a memory controller 40 and a memory device 30. For example, the memory system 100 may be integrated into a memory card device 150, as shown in FIG. 16.

The memory card device 150 includes any one of a PC card (PCMCIA, Personal Computer Memory Card Equipment International Association), a Compact Flash (referred to as CF) card, a Smart Media (referred to as SM) card, a memory device stick, a Multimedia Card (referred to as MMC), a Secure Digital Memory Card (referred to as SD) card and UFS.

In some other implementations, the memory system 100 includes a memory controller 40 and multiple memory devices 30. For example, the memory system 100 is integrated into the Solid-State Drive (SSD).

Some implementations of the present disclosure also provide an electronic device. Electronic devices can be any one of cell phones, desktop computers, tablets, laptops, servers, in-vehicle devices, wearable devices (such as smart watches, smart bracelets, smart glasses, etc.), power banks, game consoles, digital multimedia players, and/or the like.

The electronic device may include the memory system 100 described above, and may further include at least one of a central processing unit (CPU), a cache, and the like. Electronic devices can be mobile phones, desktop computers, laptop computers, tablet computers, vehicle computers, game consoles, printers, pointing devices, wearable electronics, smart sensors, virtual reality (VR) devices, augmented reality (AR) device, or any other suitable electronic device having a memory device therein. The electronic device may include a host and a memory system 100 having one or more memory devices 30 and a memory controller 40. The host may include a processor of the electronic device, such as a central processing unit (CPU), or a system-on-chip (SoC), such as an application processor (AP). The host may also include a storage interface for coupling with the memory system 100, the storage interface is configured to comply with a corresponding protocol (such as NVMe, PCIe, etc.), and the host may be configured to transmit data to or receive data from the memory device 30 via, for example, the storage interface. In order to transmit data to or receive data from the memory device 30, the host may transmit instructions to the memory system 100 in addition to data. Memory device 30 may be any memory device disclosed in this application.

According to some implementations, the memory controller 40 is coupled to the memory device 30 and the host 20, and is configured to control the memory device 30. The memory controller 40 can be specifically embodied by a microprocessor, a micro memory controller (also known as a micro memory controller unit (MCU)), a central processing unit (CPU), a digital signal processor (DSP), an application specific integrated circuit (ASIC), Field Programmable Gate Arrays (FPGA), Programmable Logic Device (PLD), state machine, gated logic unit, discrete hardware circuit, or combinations thereof, and other suitable hardware, firmware and/or software configured to perform the various functions described in detail below. The memory controller 40 may manage data stored in the memory device 30 and communicate with a host through its front-end interface. In some implementations, memory controller 40 is designed to operate in low duty cycle environments, such as secure digital (SD) cards, compact Flash (CF) cards, universal serial bus (USB) flash drive, or other media for use in electronic devices such as personal computers, digital cameras, mobile phones, and the like. In some implementations, the memory controller 40 is designed for operation in a high duty cycle environment SSD or embedded multi-media-card (eMMC) in which SSD or eMMC may be used as data memory devices of a mobile device such as a smart phone, tablet computer, laptop computer, as well as enterprise storage array. The memory controller 40 may be configured to control operations of the memory device 30, such as read, erase and program operations.

The memory controller 40 may be further configured to manage various functions related to data stored or to be stored in the memory device 30, including but not limited to bad block management, garbage collection, logical-to-programmed address translation, wear leveling, and the like. In some implementations, the memory controller 40 is further configured to process error correction code (ECC) on data read from or written to the memory device 30. Memory controller 40 may further perform any other suitable functions, such as formatting the memory device 30. Memory controller 40 can communicate with external devices (e.g., a host) according to specific communication protocols. For example, the memory controller 40 can communicate with external devices through at least one of various interface protocols. The interface protocol can be, for example, universal serial bus (USB) protocol, multimedia card (MMC) protocol, peripheral component interconnection (PCI) protocol, PCI-express (PCI-E) protocol, advanced technology attachment (ATA) protocol, serial ATA protocol, parallel ATA protocol, small computer small interface (SCSI) protocol, enhanced small disk interface (ESDI) protocol, integrated drive electronics (IDE) protocol, Firewire protocol, etc.

Figure 17:
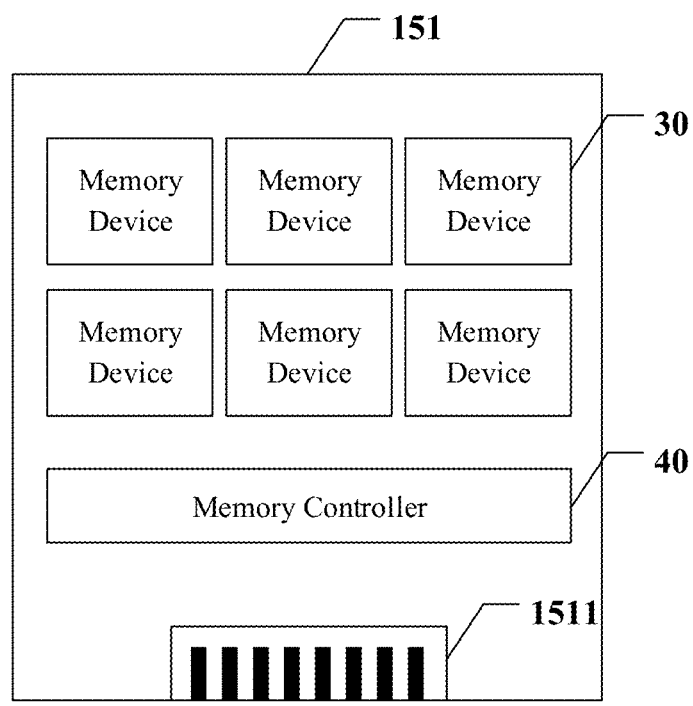
FIG. 17 illustrates a schematic diagram of an exemplary solid-state drive (SSD) with a device system of semiconductor technology field according to some aspects of the present disclosure.

The memory controller 40 and one or more memory devices 30 may be integrated into various types of memory systems, e.g., included in the same package (e.g., a universal Flash storage (UFS) package or an eMMC package). That is, the memory system 100 can be implemented and packaged into different types of terminal electronic products. In one example as shown in FIG. 16, the memory controller 40 and a single memory device 30 may be integrated into a memory card device 150. The memory card device 150 may include an internal memory device embedded in an electronic device. For example, the memory card device 150 may include a PC card (personal computer memory card international association, PCMCIA), CF card, smart media (SM) card, memory device stick, multimedia card (MMC, RS-MMC, MMC micro), SD card (SD, mini SD, micro SD, SDHC), UFS memory card, etc. The memory card device 150 may further include a memory device card connector 1501 configured to couple the memory card device 150 to a host. In another example as shown in FIG. 17, the memory controller 40 and multiple memory devices 30 may be integrated into an SSD 151, that is, a solid state disk. SSD 151 may further include a SSD connector 1511 configured to couple SSD 151 to a host. In some implementations, the storage capacity and/or operating speed of SSD 151 is greater than the storage capacity and/or operating speed of memory card device 150.

The foregoing is a specific description of the preferred implementations of the implementations of the present disclosure. In this application, specific examples are used to illustrate the principles and implementations of the application. The descriptions of the above implementations are only intended to help understand the method of the application and its core idea. At the same time, for those skilled in the art, there may be changes in the specific implementations and application scope based on the idea of this application. In summary, the content of this description should not be construed as limiting the application.

What is claimed is:

1. A memory controller for controlling a memory device, the memory device comprising a plurality of memory blocks for storing data, the memory controller being configured to:
   search, according to a number of erase cycles of the memory blocks, for a read retry table corresponding to a range to which the number of erase cycles belongs, when reading fails, the read retry table including a plurality of read bias groups;
   perform read retry operations on the memory blocks according to the plurality of read bias groups in the read retry table; and
   fetch a read retry table corresponding to a storage status of the memory blocks within the range to which the number of erase cycles belongs, according to the storage status.

2. The memory controller according to claim 1, wherein the number of erase cycles is classified into an initial stage, an early stage, and an end stage according to the numbers of erase cycles of the plurality of memory blocks.

3. The memory controller according to claim 1, wherein the storage status is classified into single-level storage status and multi-level storage status according to a programming mode of the memory blocks.

4. The memory controller according to claim 3, wherein the multi-level storage status further comprising multi-stage full storage status and multi-stage under-full storage status that are obtained by classifying according to a stored amount of the memory blocks.

5. The memory controller according to claim 1, wherein the memory controller is further configured to:
   fetch a read retry table corresponding to a test item of the memory blocks within the range to which the number of erase cycles belongs, according to the test item.

6. The memory controller according to claim 1, wherein the memory controller is further configured to:
   search, according to an average value of multiple numbers of erase cycles of the plurality of memory blocks, for a read retry table corresponding to a range to which the average value of the multiple numbers of erase cycles belongs, when reading fails.

7. The memory controller according to claim 1, wherein the read bias groups include read voltage parameters of different word lines.

8. The memory controller according to claim 1, wherein the memory controller is further configured to:
   search for a read retry table cluster corresponding to the range to which the number of erase cycles belongs; and
   sequentially load, based on a sequential order of storage arrangement of a plurality of read retry tables in the read retry table cluster, the read retry tables in the read retry table cluster to perform the read retry operations.

9. The memory controller according to claim 1, wherein the memory controller is further configured to:
   search for a read retry table cluster corresponding to the range to which the number of erase cycles belongs; and
   sequentially load, based on a sequential order of most-recently-use time of a plurality of read retry tables in the read retry table cluster, the read retry tables in the read retry table cluster to perform the read retry operations.

10. The memory controller according to claim 1, wherein the memory controller is further configured to:
    search for a read retry table cluster corresponding to the range to which the number of erase cycles belongs; and
    sequentially load, based on a sequential order of read success degrees for a plurality of read retry tables in the read retry table cluster upon performing read operations, the read retry tables in the read retry table cluster to perform the read retry operations.

11. A memory system, comprising:
    a memory device including a plurality of memory blocks for storing data, the memory block including a plurality of memory cells; and
    a memory controller for controlling the memory device, wherein the memory controller is configured to:
      search, according to a number of erase cycles of the memory blocks, for a read retry table corresponding to a range to which the number of erase cycles belongs, when reading fails, the read retry table including a plurality of read bias groups;
      perform read retry operations on the memory block according to the plurality of read bias groups in the read retry table; and
      fetch a read retry table corresponding to a storage status of the memory blocks within the range to which the number of erase cycles belongs, according to the storage status.

12. The memory system according to claim 11, wherein the number of erase cycles is classified into an initial stage, an early stage, and an end stage according to the numbers of erase cycles of the plurality of memory blocks.

13. An operation method for a memory system, the memory system comprising a memory device and a memory controller, the memory device including a plurality of memory blocks for storing data, the memory block including a plurality of memory cells, the memory controller being configured to control the memory device, the operation method comprising:
    searching, by the memory controller and according to a number of erase cycles of the memory block, for a read retry table corresponding to a range to which the number of erase cycles belongs, when reading fails, the read retry table including a plurality of read bias groups;

performing, by the memory controller, read retry operations on the memory block according to the plurality of read bias groups in the read retry table; and fetching a read retry table corresponding to a storage status of the memory blocks within the range to which the number of erase cycles belongs, according to the storage status.

14. The operation method according to claim 13, wherein the number of erase cycles is classified into an initial stage, an early stage, and an end stage, according to the numbers of erase cycles of the plurality of memory blocks.

15. The operation method according to claim 13, wherein the storage status is classified into single-level storage status and multi-level storage status according to a programming mode of the memory blocks, and the multi-level storage status further includes multi-stage full storage status and multi-stage under-full storage status that are obtained by classifying according to a stored amount of the memory blocks.

16. The operation method according to claim 13, further comprising:

searching for a read retry table cluster corresponding to the range to which the number of erase cycles belongs; and sequentially loading, based on a sequential order of storage arrangement of a plurality of read retry tables in the read retry table cluster, the read retry tables in the read retry table cluster to perform the read retry operations.

17. The operation method according to claim 13, further comprising:

searching for a read retry table cluster corresponding to the range to which the number of erase cycles belong; and sequentially loading, based on a sequential order of most-recently-use time of a plurality of read retry tables in the read retry table cluster, the read retry tables in the read retry table cluster to perform the read retry operations.

18. The operation method according to claim 13, further comprising:

searching for a read retry table cluster corresponding to the range to which the number of erase cycles belongs; and sequentially loading, based on a sequential order of read success degrees of a plurality of read retry tables in the read retry table cluster upon performing read operations, the read retry tables in the read retry table cluster to perform the read retry operations.

19. The memory system of claim 11, wherein the memory controller is configured to:

fetch a read retry table corresponding to a test item of the memory blocks within the range to which the number of erase cycles belongs, according to the test item.

20. The memory system of claim 11, wherein the memory controller is configured to:

search, according to an average value of multiple numbers of erase cycles of the plurality of memory blocks, for a read retry table corresponding to a range to which the average value of the multiple numbers of erase cycles belongs, when reading fails.

* * * * *